United States Patent
Agarwal et al.

(10) Patent No.: US 9,449,039 B2
(45) Date of Patent: *Sep. 20, 2016

(54) AUTOMATIC REPAIR OF CORRUPTED BLOCKS IN A DATABASE

(71) Applicant: Amazon Technologies, Inc., Reno, NV (US)

(72) Inventors: Deepak Agarwal, Redmond, WA (US); Anurag Windlass Gupta, Atherton, CA (US); Jakub Kulesza, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 273 days.

This patent is subject to a terminal disclaimer.

(21) Appl. No.: 13/792,671

(22) Filed: Mar. 11, 2013

(65) Prior Publication Data

US 2014/0149356 A1    May 29, 2014

Related U.S. Application Data

(60) Provisional application No. 61/730,024, filed on Nov. 26, 2012.

(51) Int. Cl.
    *G06F 17/30* (2006.01)
(52) U.S. Cl.
    CPC ... *G06F 17/30371* (2013.01); *G06F 17/30008* (2013.01); *G06F 17/30575* (2013.01)
(58) Field of Classification Search
    None
    See application file for complete search history.

(56) References Cited

U.S. PATENT DOCUMENTS

| 5,555,404 A * | 9/1996 | Torbjørnsen et al. |
| 7,647,329 B1 | 1/2010 | Fischman et al. |
| 7,814,056 B2 | 10/2010 | Mcgrattan et al. |
| 2004/0015520 A1 | 1/2004 | Ogata et al. |
| 2004/0260726 A1 | 12/2004 | Hrle et al. |
| 2005/0071391 A1 | 3/2005 | Fuerderer et al. |
| 2006/0101200 A1 | 5/2006 | Doi |
| 2007/0038682 A1 | 2/2007 | Kulesza et al. |
| 2007/0294320 A1 | 12/2007 | Yueh et al. |

(Continued)

OTHER PUBLICATIONS

U.S. Appl. No. 13/174,203, filed Jun. 30, 2011, James Christopher Sorenson et al.

(Continued)

*Primary Examiner* — Anh Tai Tran
(74) *Attorney, Agent, or Firm* — Robert C. Kowert; Meyertons, Hood, Kivlin, Kowert & Goetzel, P.C.

(57) ABSTRACT

A distributed data warehouse system maintains data blocks on behalf of clients, and stores primary and secondary copies of data blocks on different disks or nodes in a cluster. The data warehouse system may back up data blocks in a key-value backup storage system. In response to a query targeting a data block previously stored in the cluster, the data warehouse system may determine whether a consistent, uncorrupted copy of the data block is available in the cluster (e.g., by applying a consistency check). If not (e.g., if a disk or node failed), the data warehouse system may automatically initiate an operation to restore the data block from the backup storage system, using a unique identifier of the data block to access a backup copy. The target data may be returned in a query response prior to restoring primary and secondary copies of the data block in the cluster.

24 Claims, 16 Drawing Sheets

(56) References Cited

U.S. PATENT DOCUMENTS

| | | |
|---|---|---|
| 2010/0049718 A1 | 2/2010 | Aronovich et al. |
| 2010/0082553 A1 | 4/2010 | Beatty et al. |
| 2011/0004585 A1 | 1/2011 | Becker et al. |
| 2011/0138131 A1* | 6/2011 | Regni et al. ........... 711/133 |
| 2011/0184915 A1 | 7/2011 | Wu et al. |
| 2012/0117033 A1 | 5/2012 | Vaidya et al. |
| 2012/0136831 A1 | 5/2012 | Wang |
| 2012/0166487 A1* | 6/2012 | Stougie et al. .......... 707/792 |
| 2012/0179655 A1 | 7/2012 | Beatty et al. |
| 2012/0221523 A1 | 8/2012 | Bendakovsky et al. |
| 2012/0246118 A1 | 9/2012 | Feng et al. |
| 2012/0290541 A1* | 11/2012 | Anderson et al. .......... 707/685 |

OTHER PUBLICATIONS

U.S. Appl. No. 13/792,914, filed Mar. 11, 2013, Anurag Windlass Gupta.
U.S. Appl. No. 13/792,643, filed Mar. 11, 2013, Anurag Windlass Gupta et al.
Extended European Search Report for Application No. 13857518.8-1507/2923263 PCT/US2013071720, dated May 27, 2016, Amazon Technologies, Inc., pp. 1-7.
Giuseppe Decandia, et al., "Dynamo" Amazon's Highly Available Key-value Store, Proceedings of the ACM Symposium on Operating Systems Principles, Oct. 14, 2007, Amazon.com, pp. 205-220.
ParAccel, Inc., "A Technical Overview the Paraccel Analytic Database," Feb. 10, 2010, XP55273431, retrieved from the Internet: http://hosteddocs.ittoolbox.com/PADB.pdf, pp. 1-28.

* cited by examiner

AUTOMATIC REPAIR OF CORRUPTED BLOCKS IN A DATABASE

RELATED APPLICATIONS

This application claims benefit of priority to U.S. Provisional Application Ser. No. 61/730,024, entitled "STREAMING RESTORE OF A DATABASE FROM A BACKUP SYSTEM", which was filed Nov. 26, 2012, and which is incorporated herein by reference in its entirety.

BACKGROUND

A distributed storage service may include multiple concurrent processes executing across a distributed hardware infrastructure, such as one or more clusters of computers. Various ones of these processes may be executing on different physical and/or logical (e.g., virtual) machines in the cluster(s). In a storage service, for example, processes (e.g., software servers) on different machines may each expose a programmatic interface to clients, which the clients may use to access a storage system that may be implemented across multiple storage resources. The storage service may store multiple replicas of each data item in the system, such that any change to a data item on one server must be propagated to one or more other servers.

Upon the failure of a node or disk drive, the data on the failed device must be restored. In many current storage systems that provide database services, the entire data set must be restored (e.g., from a backup or archive) before the system can resume accepting and processing queries. In some systems that perform incremental backups, restoring the system after a device failure involves performing multiple incremental restore operations (corresponding to multiple incremental backup operations). In other storage systems, restoring the system after a device failure involves tracing through transaction logs to reconstruct the state of the system. For data warehouse systems that include a large number of storage devices, the amount of time that the system must be taken out of service to perform restore operations on one or a small number of devices may represent a significant cost in the system.

Figure 1:
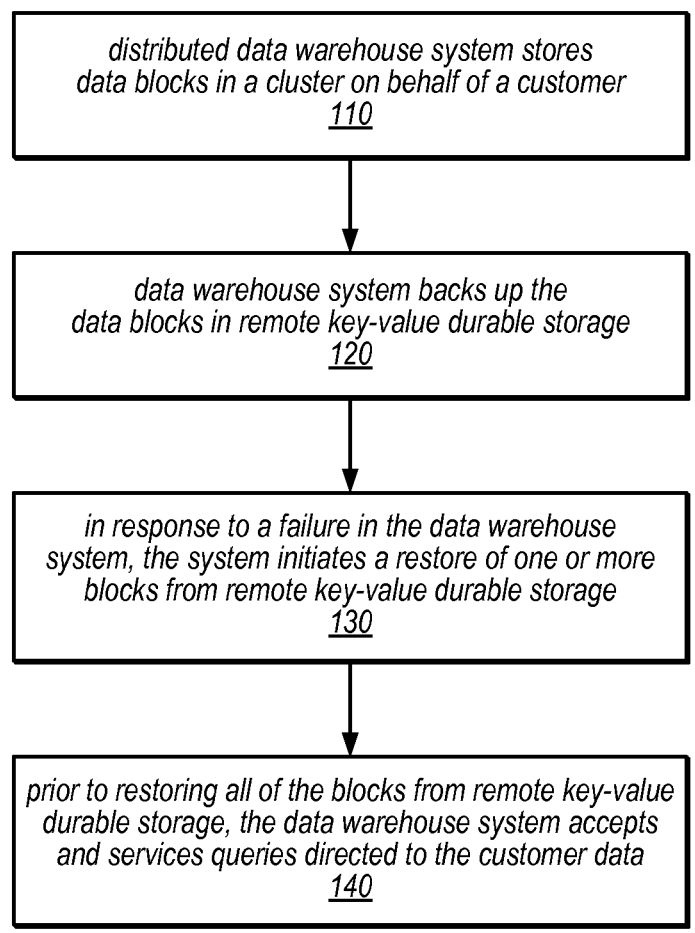
FIG. 1 is a flow diagram illustrating one embodiment of a method for performing a streaming restore operation from a remote key-value durable storage system.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The systems described herein may, in some embodiments, implement a web service that makes it quick, easy, and cost-effective for clients (e.g., subscribers) to set up, operate, and scale a data warehouse in a cloud computing environment. The web service may manage time-consuming administration tasks, allowing subscribers to focus on their own applications and businesses. In some embodiments, the data warehouse system may be an enterprise-class database query and management system that is highly scalable and extensible. It may provide fast querying capabilities over structured data, may provide integration with various data loading and ETL (extract, transform, and load) tools, may provide client connections with best-in-class business intelligence (BI) reporting, data mining, and analytics tools, and may be optimized for very fast execution of complex analytic queries such as those including multi-table joins, sub-queries, and aggregation. In some embodiments, queries may be distributed and parallelized across multiple physical resources, and the data warehouse system may be scaled up or down on an as needed basis. In some embodiments, subscribers may only pay for the resources they use. The data warehouse system may work effectively with database schemas of various types and/or organizations, in different embodiments.

In some embodiments, the distributed data warehouse systems described herein may derive much of their performance and fast computing power from the use of massively-parallel processing (MPP) and the clustering of compute nodes that carry out the execution of compiled queries using a divide-and-conquer strategy. In some embodiments, a cluster may include one or more nodes, each including one or more disks, solid state devices, or other persistent storage devices on which data blocks are stored on behalf of clients. In some embodiments, clients/subscribers may submit queries in a number of ways, e.g., interactively via an SQL interface to the data warehouse system. In other embodiments, external applications and programs may submit queries using Open Database Connectivity (ODBC) and/or Java Database Connectivity (JDBC) driver interfaces to the data warehouse system.

In typical large database systems, the time it takes to restore data from a backup may represent a significant cost to the system. For example, in many existing systems, the entire data set needs to be restored before the database system can be restarted following a failure in the system. In some embodiments, the data warehouse systems described herein may be configured to back up data (e.g., the data making up various database tables) to a remote key-value storage system incrementally (e.g., one physical data block at a time), and to store, as part of each incremental backup operation, a list of the all of the data blocks in the system, whether they were backed up as part of that incremental backup or as part of a previous incremental backup operation. In some embodiments, the remote key-value storage system may be dedicated for backup storage, while in other embodiments the remote key-value storage system may provide general-purpose storage for a variety of clients and/or client applications. In various embodiments, a data warehouse system, a general-purpose computing system, or a computing system that provides another type of service that stores data locally in-memory (e.g., ephemerally) may write one or more copies of the data to a remote key-value storage system that employs disk, solid-state storage devices, or another type of persistent storage media in order to provide durability. As described in more detail below, the data warehouse systems described herein may be able to restart a cluster that stores data on behalf of a storage system subscriber (e.g., in a database) following a failure (i.e., allowing it to accept and service queries) without waiting for the entire data set to be restored from backup. Instead, a backup copy of any lost or corrupted data block may be streamed into the memory of the data warehouse system from the backup system by directly addressing it in the remote system using a unique identifier of the data block as a key.

Note that in the descriptions herein, the terms "data block" and "physical data block" may be used to refer to a portion (or block) of data that is stored as an individual (or separable) object in a distributed data warehouse system and/or in a remote key-value durable backup storage system on behalf of clients (e.g., users, client applications, and/or data warehouse service subscribers), or may be used to refer to that portion (or block) of the data as it is stored on a physical disk in a distributed data warehouse system, in system memory on a node in a distributed warehouse system (e.g., in systems that implement in-memory databases) and/or in a remote key-value durable backup storage system, depending on the context in which these terms appear. In some embodiments, data may be stored in data blocks having the same size as a standard unit of the data stored in the memory architecture for the system, which may correspond to a "page" in the memory. In other embodiments, the data blocks may be of a different size than the page size of the memory.

In some embodiments, the distributed data warehouse systems described herein may store two or more copies of each data block locally in the system (e.g., across a cluster architecture). For example, in one embodiment, a primary copy of each 1 MB physical data block may be stored on one disk of a node in a cluster, and one or more secondary copies (replicas) of that physical data block may be stored on other disks of other nodes in the same cluster. However, rather than replicating (or mirroring) an entire disk on one other disk, the copies of some of the data blocks stored on a given disk may be distributed on different disks than the copies of other data blocks stored on the given disk. The distributed data warehouse system may also store a copy of each data block as a separate object (i.e., value) in a remote backup storage system that provides durable key-value storage, and may store the keys for each data block within a list of data blocks in the system. For example, a superblock data structure that lists all of the data blocks stored in the data warehouse system (or in a node thereof) may include multiple entries, each of which stores metadata about an individual data block, and the metadata for each block may include a unique identifier (ID) that serves as a key to access a copy of the data block stored in the remote backup storage system. In some embodiments, the distributed data warehouse system may provide very high durability storage to its clients/subscribers by storing two copies of each data block in a given cluster (e.g., a primary copy and a secondary copy) and storing a third copy in a remote key-value durable storage system.

In some embodiments, when a disk or node in the distributed data warehouse fails, it may or may not be possible to restore the lost or corrupted data blocks from other disks within the cluster, depending on the type and/or extent of the failure. For example, if the failure is a disk failure or a node failure, it may be possible to restore lost or corrupted data blocks by copying them from the other disks within the cluster that store replicas of those data blocks (i.e., to quickly reconstruct the database from data stored within the cluster itself). However, if the failure is a failure of an entire cluster, or is another type of failure after which it is not possible to reconstruct the lost or corrupted data blocks from within the cluster, the distributed data warehouse may be configured to retrieve data from the backup storage system in order to reconstruct the lost or corrupted data blocks. As described in more detail herein, in some embodiments, the copies of data blocks in the remote storage system may be accessed in order to satisfy query request before or after they have been retrieved (i.e., streamed in) from the remote storage system. For example, in some embodiments, the distributed data warehouse system may be configured to continue (or restart) accepting and processing queries while a data set is being reconstructed in the background. In other words, following a failure, the distributed data warehouse systems described herein may be configured to stream data in from the backup system on demand until or unless the entire data set (or at least the data targeted by any received queries) is restored. As described in more detail below, in some embodiments, data blocks may be restored from remote storage in order of how recently or how often they have been accessed in the distributed data warehouse, or in order of how likely they are to be accessed in the near future.

One embodiment of a method for performing a streaming restore operation from a remote key-value durable storage system is illustrated by the flow diagram in FIG. 1. As illustrated at 110, in this example, the method may include a distributed data warehouse system storing data blocks in a cluster on behalf of a customer (e.g., a user, a client application, or a storage service subscriber). The method may include the data warehouse system backing up the data blocks by storing copies of the data blocks in a remote key-value durable storage, as in 120. As illustrated in this example, in response to a failure in the data warehouse system, the method may include the data warehouse system initiating the restoration of one or more data blocks from the remote key-value durable storage, as in 130. The method may also include, prior to all of the targeted data blocks being restored from the remote key-value durable storage, the data warehouse system accepting and servicing queries (e.g., read requests and/or write requests) directed to the customer data, as in 140. In other words, the distributed data warehouse system may be able to begin or to continue to accept and service query requests following a failure without having to restore the entire data set, as in some previous database systems. For example, if only a portion of a cluster in the data warehouse system fails, the cluster may continue to accept and service queries without interruption. If an entire cluster fails (and affects all of the superblocks on the nodes in that cluster), one or more of the superblocks may need to be brought into system memory before queries directed to the cluster can be accepted and/or serviced so that the targeted data can be accessed in remote key-value durable storage. In some embodiments, each superblock may be mirrored on one or more nodes other than the particular node for which it stores information (i.e., information about the data blocks stored as primary copies on the particular node).

In some embodiments, the distributed data warehouse systems described herein may employ columnar storage for database tables. In other words, column information from database tables may be stored into data blocks on disk, rather than storing entire rows of columns in each data block (as in traditional database schemes). In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, the column field values for many more rows may be retrieved than if each data block stored an entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data). For example, for database operations that only need to access and/or operate on one or a small number of columns at a time, less memory space may be required than with traditional row-based storage, since only data blocks storing data in the particular columns that are actually needed to execute a query may be retrieved and stored in memory.

In various embodiments, the distributed data warehouse systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), cancelling or aborting a query, and/or other operations.

In some embodiments, each cluster of the distributed data warehouse systems described herein may include a leader node and multiple computing nodes (i.e. non-leader nodes, such as query engines), each of which is virtual machine having some amount of storage (e.g., multiple disks) and/or processing power. In some embodiments, once it is configured, a cluster may be directly visible by (and accessible to) a client/subscriber through a network address. In other words, a client/subscriber may connect directly to a cluster (e.g., to submit queries and receive responses to those queries) and may not have to go through a web server (or service) to access the cluster except to set up and manage the configuration of the cluster. In some embodiments, the leader node in each cluster (which may not store client/subscriber data) may maintain query plans (e.g., including schema information and/or metadata) for performing various types of queries on the data stored by the computing nodes in the cluster. Within the leader node, a scheduler process may send query tasks (e.g., via a private network communication fabric) to the compute nodes for execution. In some embodiments, the leader node may also be responsible for partitioning incoming data (i.e., data included in write requests) for storage on various nodes of the cluster. For example, the leader node may determine the nodes on which primary copies of different portions of the received data will be stored.

In some embodiments, when a client request to perform a query (e.g., a read request or a write request) or some other type of database operation is received (e.g., by the leader node in a cluster), the distributed data warehouse system may spawn a new process to maintain session information for the client, and that process may be maintained as long as the client session remains open and that client is sending query requests to the leader node. The requested operation (a SQL query or some other database operation) may be routed through a parser and optimizer to develop a query execution plan to perform or execute the specified query or database operation (i.e., the logical steps needed to perform the query). The query plan may then be routed to the execution engine, which generates and compiles query execution code that the leader node and the non-leader nodes (sometimes referred to herein as the compute nodes) will execute to complete the query. In some embodiments, each of the individual execution plan steps may be involve a simple operation or manipulation of data, to be performed by the compute nodes or the leader node, and the communication network connecting the leader node and compute nodes may be used to distribute intermediate results. In some embodiments, the distributed data warehouse system may achieve excellent query execution performance by separating query processes in each of multiple node slices in order to execute the compiled query code in parallel. In addition, the distributed data warehouse system may take advantage of optimized network communication, memory and disk management to pass intermediate results from one query plan step to the next, which may also help to speed query execution. In some embodiments, the last segment of a query may return the requested data. If the return set is to be aggregated or sorted, the compute nodes may each send a respective portion of the intermediate result to the leader node, which may then merge the returned data so that the final result of the query can be sent back to the requesting client/subscriber.

Figure 2:
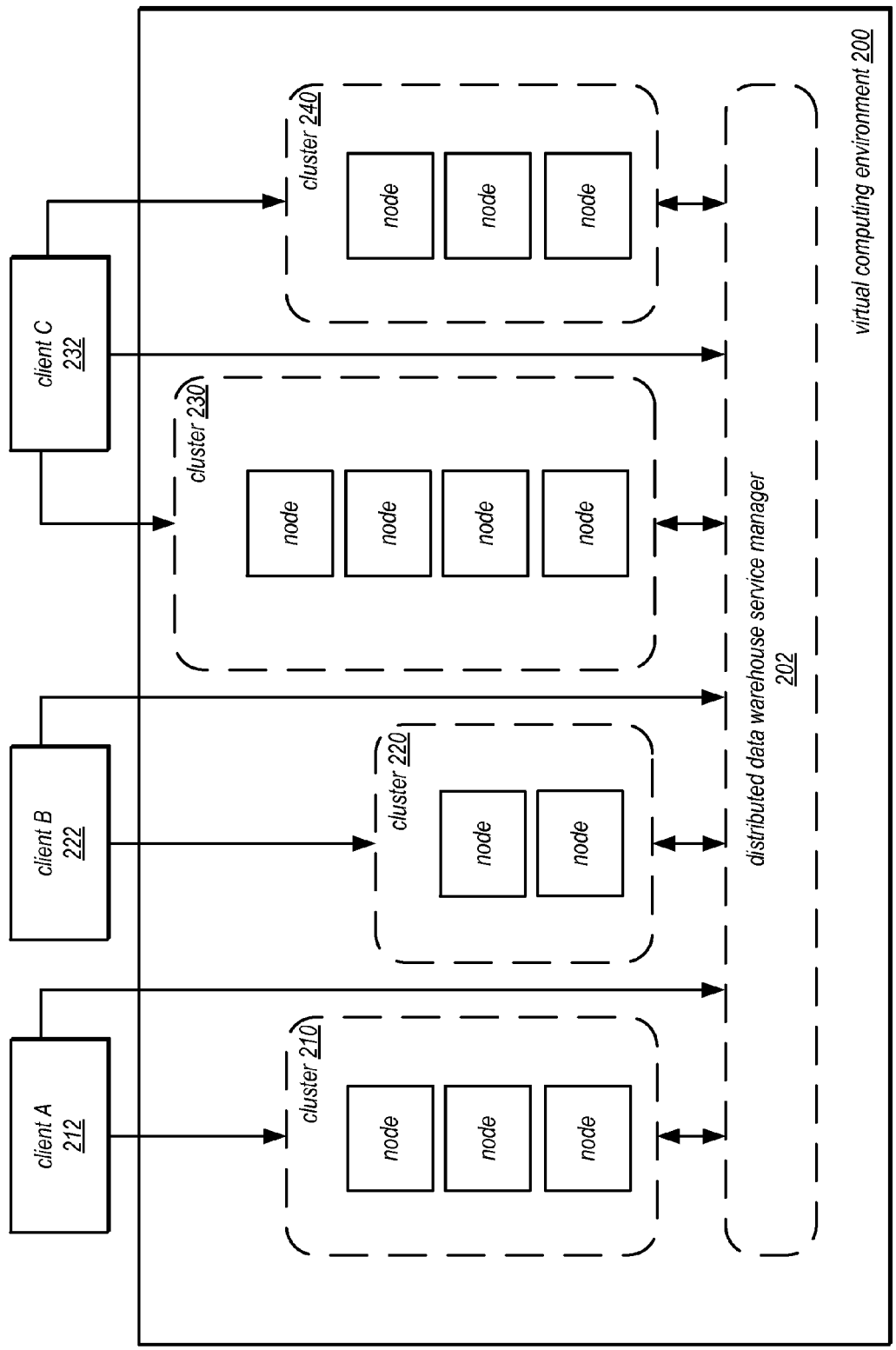
FIG. 2 is a block diagram illustrating various components of a distributed data warehouse service from the perspective of its clients, according to some embodiments.

FIG. 2 is a block diagram illustrating various components of a distributed data warehouse service from the perspective of its clients (which may include users, client applications, and/or data warehouse service subscribers), according to some embodiments. In this example, each of the clients 212, 222, and 232 is able to access one or more of clusters 210, 220, 230, and 240 in a virtual computing environment 200. As illustrated in FIG. 2, each of the clusters 210, 220, 230, and 240 includes two or more nodes on which data may be stored on behalf of the particular ones of clients 212, 222, and 232 who have access to those clusters. As illustrated in this example, the clients 212, 222, and 232 may be able to access a distributed data warehouse service manager 202, e.g., in order to set up and manage the configuration of the clusters to which it has access, but once those clusters have been configured, the clients may be able to access them directly (e.g., without going through a service interface of the distributed data warehouse service).

Figure 3:
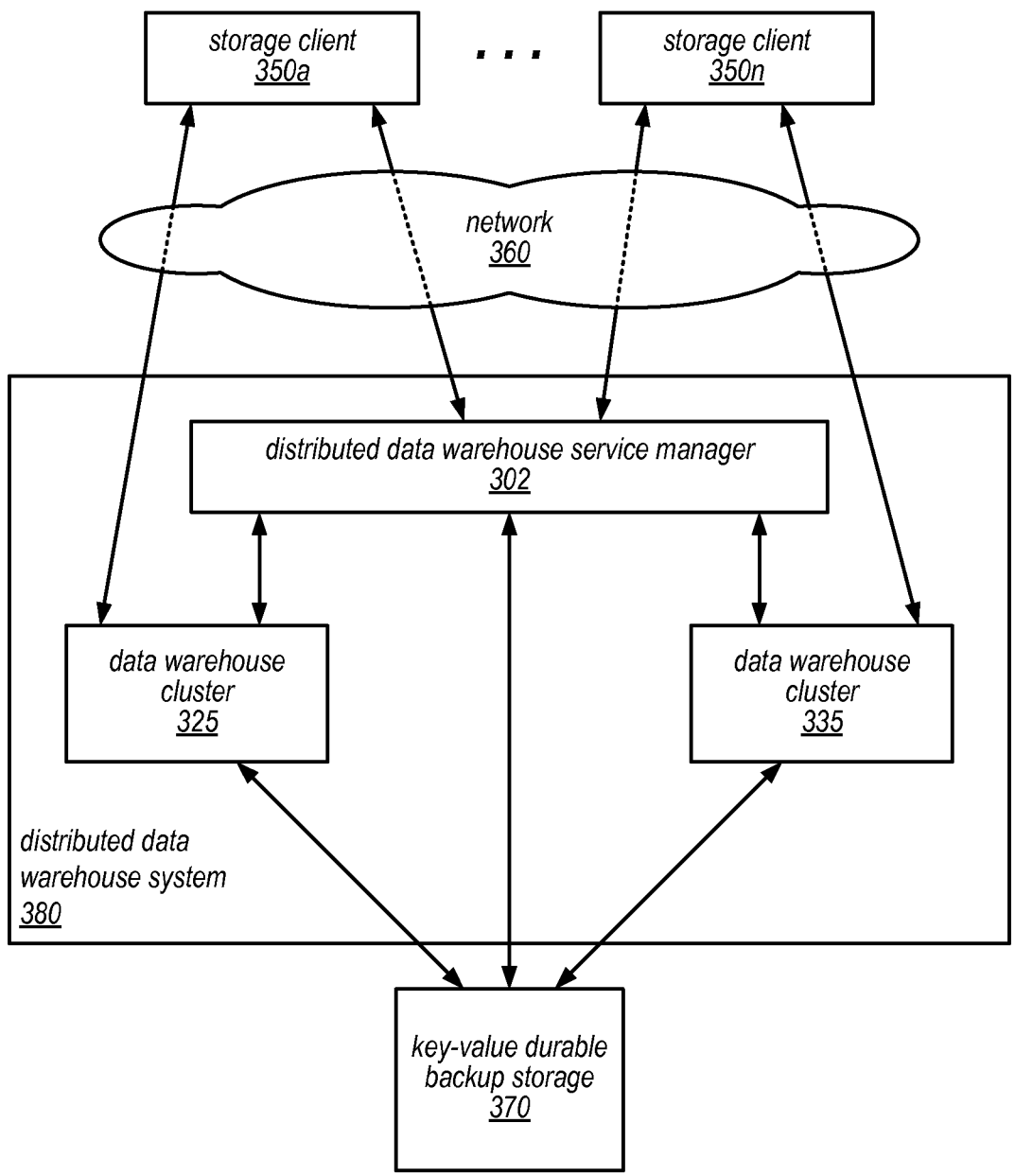
FIG. 3 is a block diagram illustrating various components of a distributed data warehouse system, according to one embodiment.

FIG. 3 is also a block diagram illustrating various components of a distributed data warehouse system, some of which may not be visible to the clients of the distributed data warehouse system, according to one embodiment. As illustrated in this example, storage clients 350a-350n may access distributed data warehouse service manager 302, and/or data warehouse clusters 325 and 335 within distributed data warehouse system 380 via network 360 (e.g., these components may be network-addressable and accessible to the storage clients 350a-350n). However, key-value durable backup storage 370, which may be employed by distributed data warehouse system 380 when automatically performing various backup and restore operations, such as those described herein, may or may not be network-addressable and accessible to the storage clients 350a-350n, in different embodiments. For example, in some embodiments, distributed data warehouse system 380 may perform these operations and/or other operations involving key-value durable backup storage 370 (including patching in backup copies of data blocks that are not currently available in distributed data warehouse system 380 in order to satisfy queries received from storage clients 350a-350n) in a manner that is invisible to storage clients 350a-350n.

As previously noted, a distributed data warehouse system cluster may include a single leader node server that receives requests from various client programs (e.g., applications) and/or subscribers (users), then parses them and develops an execution plan to carry out the associated database operation(s). More specifically, the leader node may develop the series of steps necessary to obtain results for complex queries and joins. In some embodiments, the leader node may manage communications between the distributed data warehouse system and clients/subscribers, as well as communications with compute nodes that are instructed to carry out database operations. For example, the compiled code may be distributed by the leader node to various compute nodes to carry out the steps needed to perform queries, and intermediate results of those queries may be sent back to the leader node.

In some embodiments, a distributed data warehouse system cluster may also include one or more compute node servers, and each may include individual query processing "slices" defined, for example, for each core of a server's multi-core processor. The compute nodes may perform the processing of queries by executing the compiled code of the execution plan, and may send intermediate results from those queries back to the leader node for final aggregation. Each core or slice may be allocated a portion of the corresponding node server's memory and disk space in order to process a portion of the workload for a query (or other database operation) that is sent to one or more of the compute node servers. In some embodiments, an interconnect network in the cluster may provide private network communication using a standard or customer protocol, such as a custom User Datagram Protocol (UDP) to exchange compiled code and data between the leader node and the compute nodes.

Figure 4:
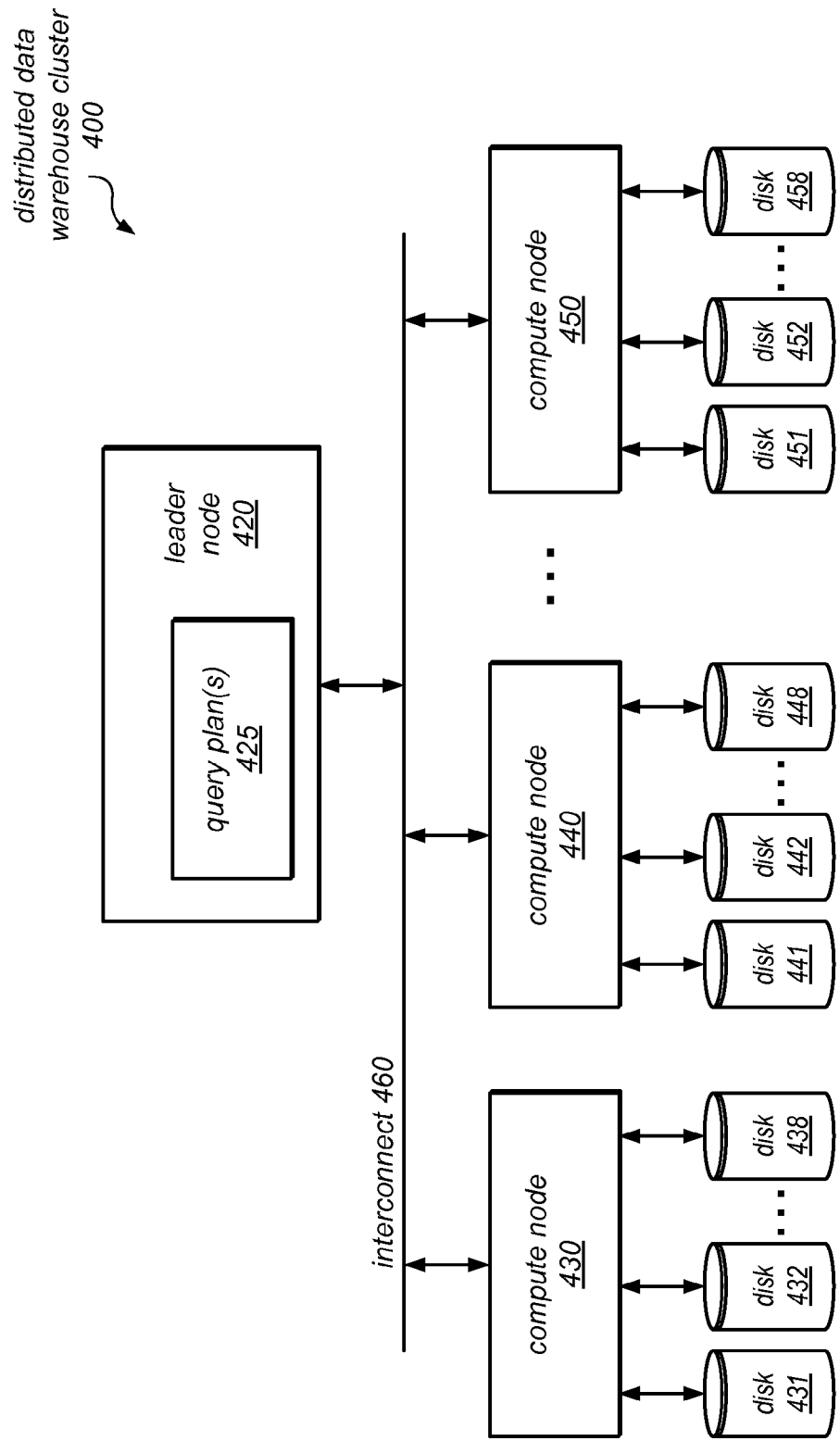
FIG. 4 is a block diagram illustrating a cluster in a distributed data warehouse system, according to one embodiment.

FIG. 4 is a block diagram illustrating a cluster in a distributed data warehouse system, according to one embodiment. As illustrated in this example, a distributed data warehouse cluster 400 may include a leader node 420 and compute nodes 430, 440, and 450, which may communicate with each other over an interconnect 460. As described above, leader node 420 may generate and/or maintain one or more query plans 425 for executing queries on distributed data warehouse cluster 400. As described herein, each node in a distributed data warehouse cluster may include multiple disks on which data blocks may be stored on behalf of clients (e.g., users, client applications, and/or distributed data warehouse service subscribers). In this example, compute node 430 includes disks 431-438, compute node 440 includes disks 441-448, and compute node 450 includes disks 451-458. In some embodiments, a component of the distributed data warehouse cluster (or the distributed data warehouse system of which it is a component) may support load balancing, using any of a variety of applicable load balancing techniques. For example, in some embodiments, leader node 420 may include a load balancing component (not shown).

In some embodiments, each of the compute nodes in a cluster implements a set of processes running on the node server's operating system that manage communication with the leader node, e.g., to receive commands, send back data, and route compiled code to individual query processes (e.g., for each core or slice on the node) in order to execute a given query. In some embodiments, each of compute nodes includes a superblock, which is a data structure (e.g., an array of data) whose entries store information (e.g., metadata about each of the data blocks stored on that node (i.e., one entry per data block). In some embodiments, each entry of the superblock data structure includes a unique ID for a respective block, and that unique ID may be used as a key to retrieve a copy of that data block in the remote key-value durable backup storage system). In some embodiments, the unique ID may be generated (and a corresponding entry in the superblock created) by the leader node or by a computing node when the data block is first written in the distributed data warehouse system.

In various embodiments, in addition to a unique ID for a data block, the metadata contained in each entry of a superblock data structure on a given node in a cluster of a distributed data warehouse system may include one or more of the following: an indication of whether the block has been backed up, one or more counts of the number of times it has been accessed (e.g., in a given period or between particular events), the location of a primary copy of the data block on the node, the location of one or more secondary copies of the data block on other nodes in the cluster, and/or a mapping between a primary copy stored on the node and any secondary copies stored on other nodes in the cluster. For example, each node may own a primary copy of a subset of the data blocks stored by the cluster and may also store a secondary copy of one or more other data blocks whose primary copies are owned by another node in the cluster (and vice versa). In some embodiments, each computing node (or, more specifically, the superblock on each node) may know which other nodes store secondary copies of its primary data block copies. In some embodiments, each node that owns a primary copy of a data block may be configured to determine which other nodes will store one or more secondary copies of that data block and may initiate its replication on those other nodes. In some embodiments, the superblock or the leader node may maintain a mapping between the ranges of data stored in a database table on behalf of a client/subscriber and the node(s) on which that data is stored. In various embodiments, secondary copies of a data block may be used to restore a lost or corrupted primary copy of a data block and/or may be used to satisfy queries that target the data block during a restore operation (e.g., prior to the primary copy of the target data block being restored or prior to completion of a restoration operation for an entire disk or node). Note that while several of the embodiments described herein include primary and secondary copies of each data block stored in a data warehouse system, in other embodiments, only one copy of each data block may be stored in the data warehouse system, or multiple parallel copies (none of which has a special role as a "primary" copy) may be stored on different nodes in the system.

Figure 5:
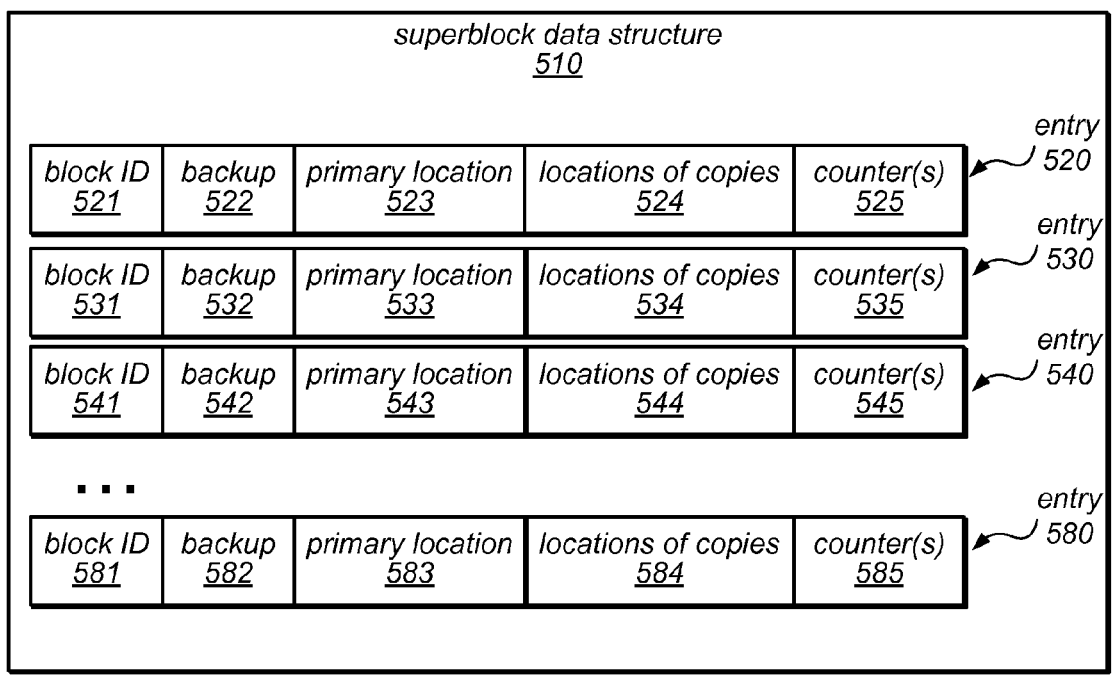
FIG. 5 is a block diagram illustrating a superblock data structure, according to one embodiment.

FIG. 5 is a block diagram illustrating a superblock data structure, according to one embodiment. In this example, superblock 510 is an array that includes multiple entries (e.g., entries 520-528), each of which stores metadata about a data block. In this example, each of the entries in the array includes a block ID, an indication of whether the block has been backed up, an indication of the location of the primary copy of the block, indications of the locations of any secondary copies of the block stored in the cluster, and one or more data block access counters (as described in more detail below). For example, entry 520 includes block ID 521, backup indicator 522, primary location value 523, one or more copy location values 524, and one or more counters 525. Similarly, entry 530 includes block ID 531, backup indicator 532, primary location value 533, one or more copy location values 534, and one or more counters 535; entry 540 includes block ID 541, backup indicator 542, primary location value 543, one or more copy location values 544, and one or more counters 545; and entry 580 includes block ID 581, backup indicator 582, primary location value 583, one or more copy location values 584, and one or more counters 585.

In some embodiments, all data blocks written to the distributed data warehouse system and backed up in the remote key-value durable backup storage system may be written as new data blocks having a new, unique ID. Note, however, that other embodiments may support the updating or modification of stored data blocks. In such embodiments, in addition to tracking whether a data block has been backed up, an entry in a corresponding superblock may track when a data block is updated. In such embodiments, when a data block is updated, its entry in the superblock may be updated to point to a different version of the data block (and its replicas). When a copy of the updated data block is written to the remote key-value durable backup storage system, it may overwrite the previous copy of the data block, or its key may be reassigned such that it subsequently accesses the updated version of the data block.

Figure 6:
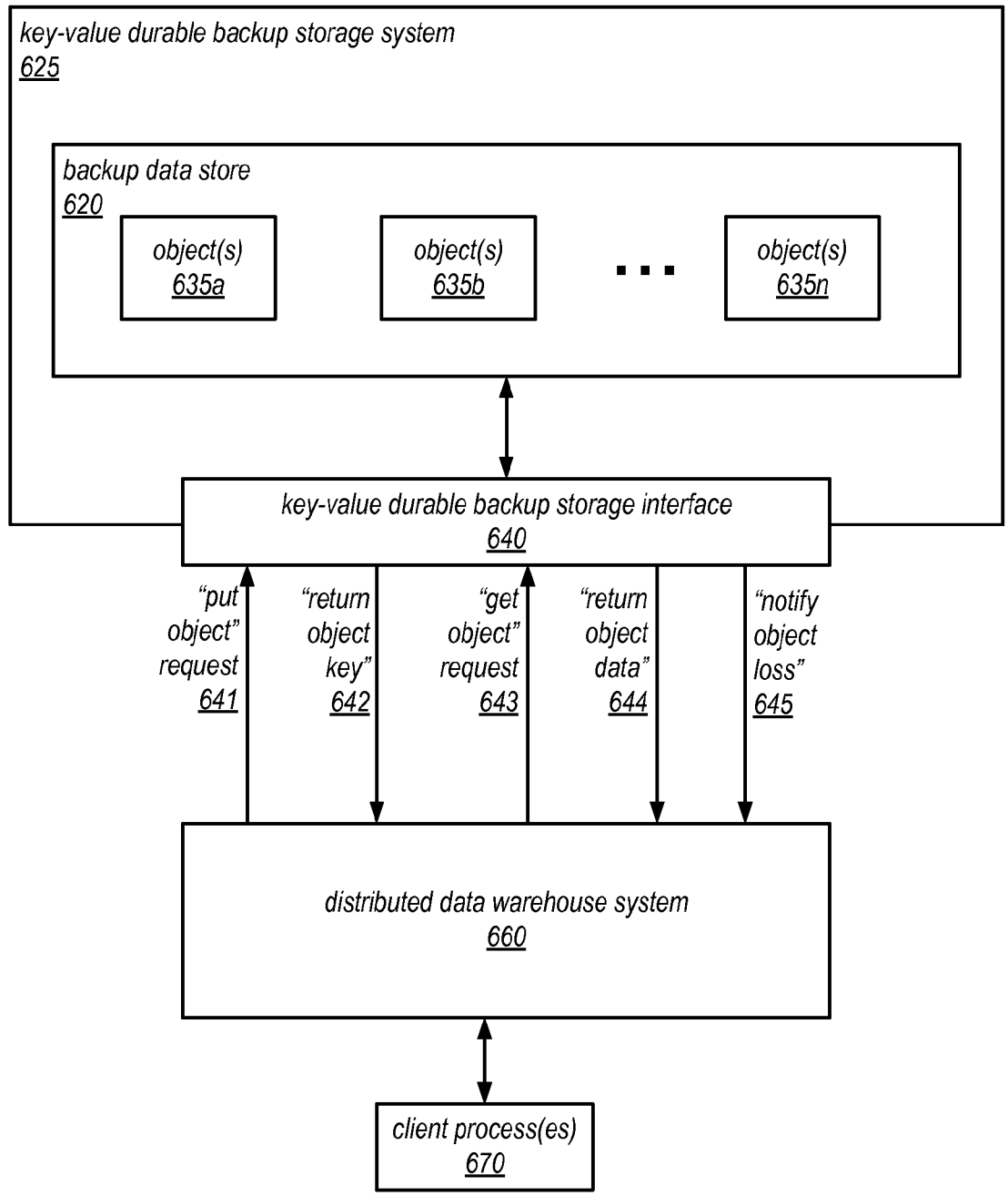
FIG. 6 is a block diagram illustrating the use of a remote key-value durable storage system for backing up a data stored in distributed data warehouse system, according to one embodiment.

FIG. 6 is a block diagram illustrating the use of a remote key-value durable storage system for backing up a data stored in distributed data warehouse system, according to one embodiment. In this example, one or more client processes 670 may store data in distributed data warehouse system 660, which may leverage a key-value durable backup storage system 625. The APIs 641-645 of key-value durable backup storage interface 640 may expose functionality of the key-value durable backup storage system 625 provided in backup data store 620 to distributed data warehouse system 660 as if distributed data warehouse system 660 were a client of key-value durable backup storage system 625. For example, distributed data warehouse system 660 may perform functions such as uploading or retrieving data from backup data store 620 through these APIs to perform backup and restore operations for data maintained in distributed data warehouse system 660. As illustrated in FIG. 6, key-value durable backup storage system 625 may store data blocks as objects in backup data store 620 (shown as objects 635a-635n). As previously noted, each of the objects stored in backup data store 620 of key-value durable backup storage system 625 may be retrieved by distributed data warehouse system 660 using a respective, unique key. In some embodiments, key-value durable backup storage system 625 may provide high durability for stored objects (e.g., through the application of various types of redundancy schemes).

In the example illustrated in FIG. 6, distributed data warehouse system 660 may back up data blocks to backup data store 620 of key-value durable backup storage system 625 according to a "put object" API (shown as 641) and may receive acknowledgment of those operations through a corresponding "return object key" API (shown as 642). In this example, data blocks stored as objects in backup data store 620 may be retrieved from backup data store 620 according to a "get object" API of key-value durable backup storage system 625 (shown as 643) and may receive the requested data through a corresponding "return object data" API (shown as 644). In some embodiments, key-value durable backup storage system 625 may notify distributed data warehouse system 660 when object data that was stored by distributed data warehouse system 660 in backup data store 620 has been lost through a "notify object loss" API (shown as 645). In other embodiments, the APIs provided by key-value durable backup storage system 625 may include more, fewer, or different APIs for invoking or receiving responses to storage-related operations or other operations. For example, in some embodiments, the APIs for a key-value durable backup storage system may include a "delete object" API that includes the key of an object (i.e., a unique data block identifier) as an input parameter. In such embodiments, in response to receiving a request to delete an object according to this API, the key-value durable backup storage system 625 may locate the object in backup data store 620 (e.g., using the key) and may delete it from backup data store 620.

Note that in various embodiments, the API calls and responses between distributed data warehouse system 660 and key-value durable backup storage interface APIs 641-645 in FIG. 6 may be performed over a secure proxy connection (e.g., one managed by a gateway control plane), or may be performed over the public network or, alternatively, over a private channel such as a virtual private network (VPN) connection. These and other APIs to the key-value durable backup storage system 625 may be implemented according to different technologies, including, but not limited to, Simple Object Access Protocol (SOAP) technology and Representational state transfer (REST) technology. In other words, the APIs to the key-value durable backup storage system 625 may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with the key-value durable backup storage system 625.

As previously noted, in some embodiments, the distributed data warehouse system may store a single primary copy of each data block on one disk of one node in a given cluster and may store one or more other local copies (secondary copies) of each data block on respective disk(s) of other node(s) in the same cluster. As noted above, these secondary copies may mirror the data stored by various disks on a block basis, rather than mirroring data on a whole disk basis. An additional copy (i.e., a backup copy) may be written to a remote key-value durable storage system (i.e., a storage system that is not part of the distributed data warehouse system or any of the clusters thereof). This backup copy may be slower to access but may be highly durable.

In some embodiments, the backup copy of a data block that is stored in the remote storage system may be patched (or "faulted") into the system memory in the distributed data warehouse system if there is a failure in the distributed data warehouse affecting that data block and there is no way to restore the data block from information available in its cluster. In other words, a backup copy of a data block may be retrieved from remote backup storage when no primary or secondary copies within the cluster are available. For example, the distributed data warehouse system may continue to service queries directed to a particular data block following a failure that involved the particular data block by streaming in the data block from the backup system on demand using a foreground process (i.e., if the data block is needed to respond to a query), while a background process works to restore lost or corrupted data (on a data block basis) to fully reconstruct the data set on various disks and nodes of a cluster in the distributed data warehouse system.

Figure 7:
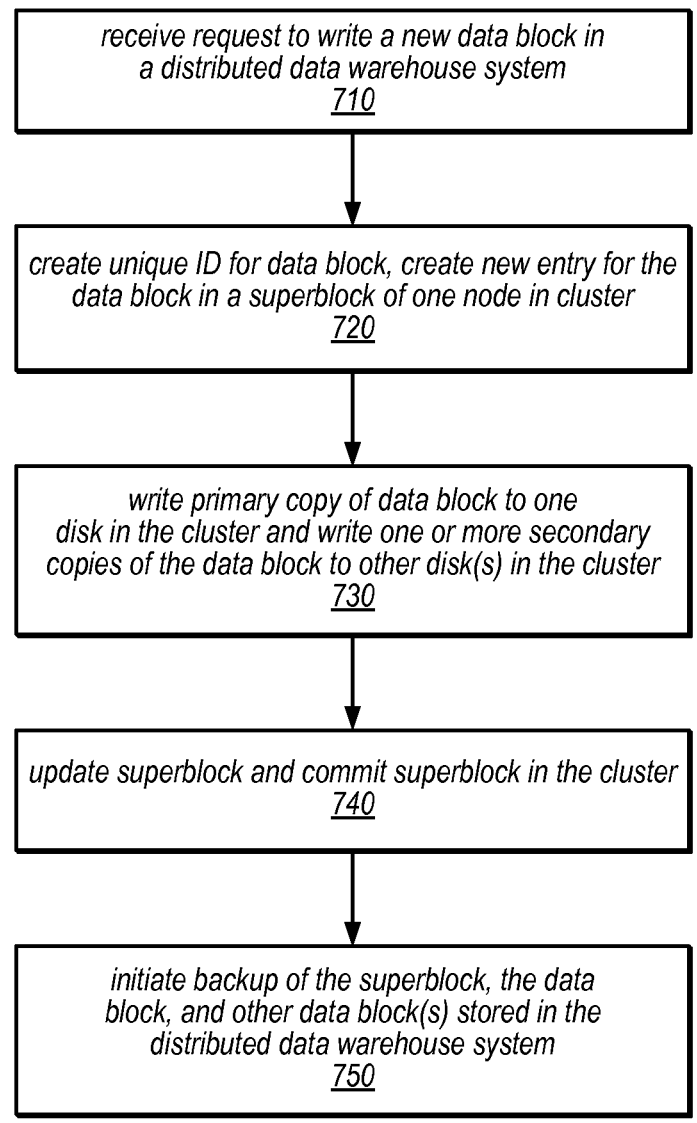
FIG. 7 is a flow diagram illustrating one embodiment of a method for storing a data block in a distributed data warehouse system.

One embodiment of a method for storing a data block in a distributed data warehouse system is illustrated by the flow diagram in FIG. 7. As illustrated at 710, in this example, the method may include receiving a request to write a new data block in a distributed data warehouse system. In response to receiving the request, the method may include creating a unique ID for the data block, and creating a new entry for the data block in a superblock data structure of one node in the cluster (e.g., the node on which the primary copy of the data block will be stored), as in 720. In some embodiments, the unique ID created for the data block may be stored in the new entry in the superblock data structure when it is created, and may be subsequently used by other operations as an index into that entry in the data structure.

As illustrated in this example, the method may include writing a primary copy of the data block to one disk on a node in the cluster and writing one or more secondary copies of the data block to other disk(s) (on the same node or on different nodes) in the cluster, as in 730. The method may also include updating the corresponding entry in the superblock (e.g., to indicate the locations of the primary and secondary copies of the data block) and committing the superblock in the cluster, as in 740 (which may include replicating it across the cluster, or propagating all or a portion of the data stored in it across the cluster, in some embodiments). At some point subsequent to storing the primary and secondary copies of the data block and updating the superblock data structure, the method may include initiating a backup of the superblock, the data block, and one or more other data blocks stored in the distributed data warehouse system, as in 750. For example, backup operations may be performed periodically (e.g., on a predetermined schedule), or in response to various pre-defined trigger events or conditions (e.g., after a pre-determined number of new blocks have been created in the system, or after each time the superblock data structure is updated and/or committed in the system), in different embodiments. Example backup operations are described in more detail below, according to various embodiments.

As previously noted, the systems described herein may implement block-level storage in a cluster-based architecture, and may back up and restore data on a block basis (e.g., backing up and restoring data in units corresponding to physical data blocks), rather than managing data on a file basis and/or using knowledge of the rows or columns of a database table. Note that in some embodiments, only committed blocks may be backed up to the remote key-value durable backup storage system (i.e., no in-flight transactions are reflected in what is backed up). In various embodiments, the remote key-value backup storage systems described herein may employ replication, parity, erasure coding, or another error correction technique to provide high durability for the backup copies of the data maintained by the data warehouse system on behalf of clients.

In some embodiments, a restore operation may begin by bringing up the data warehouse system immediately, using a list to indicate where each data block is locally as well as in backup storage. Initially, the local list may be empty. Subsequently, a background process may be invoked to stream data blocks back into the data warehouse system from backup storage. In the meantime, foreground processes may begin (or continue) processing queries. When and if the foreground processes encounter a request for data in a data block that has not yet been brought back into the data warehouse system from backup, the data block may "fault" itself in, as required.

Figure 8:
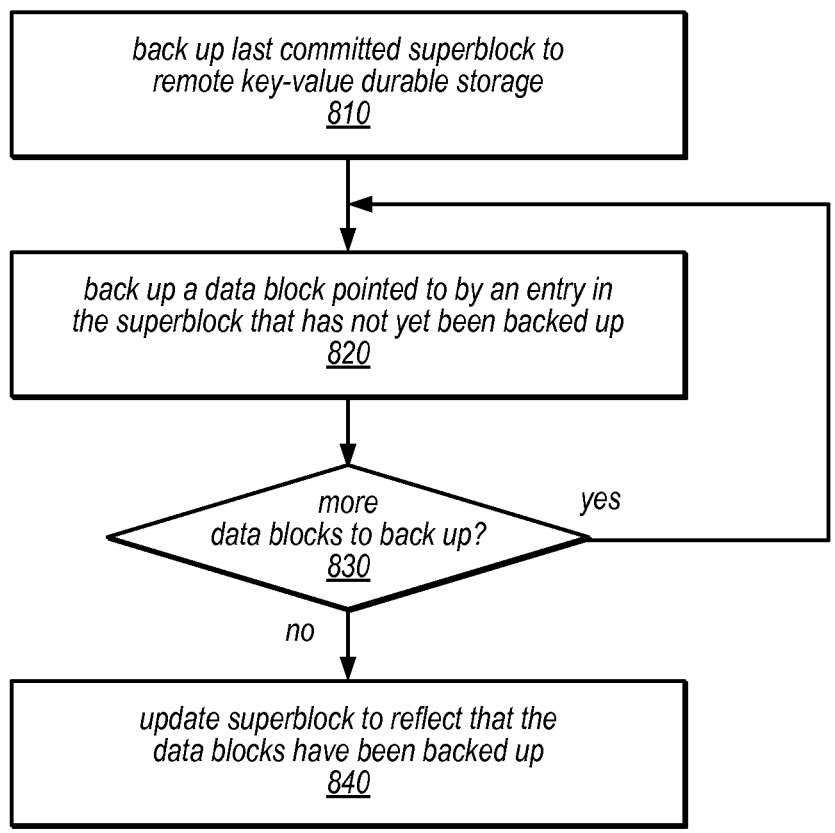
FIG. 8 is a flow diagram illustrating one embodiment of a method for performing a backup operation in a distributed data warehouse system.

One embodiment of a method for performing a backup operation in a distributed data warehouse system is illustrated by the flow diagram in FIG. 8. As illustrated at 810, in this example, the method may include backing up the last committed superblock of a node to a remote key-value durable storage. In some embodiments, the superblock data structure may be too large to be backed up as a single object in remote key-value durable storage, and may be stored as a collection of objects, each representing a sub-array of the superblock data structure and each having its own unique identifier (i.e., key). In other embodiments, the superblock data structure may be stored as a single object in remote key-value durable storage, and may have a single, unique identifier (i.e., key). As previously noted, the superblock may indicate, for each data block stored in the distributed data warehouse system, whether that data block has been backed up. As illustrated in FIG. 8, the method may include backing up a data block pointed to by an entry in the superblock that has not yet been backed up, as in 820. For example, data blocks that are new and/or data blocks that have not been backed up since the last time they were modified may be targeted for back up during this backup operation.

If there are more data blocks to back up (shown as the positive exit from 830), the method may include repeating the operation illustrated at 820 for each additional data block to be backed up. This is illustrated in FIG. 8 by the feedback from 830 to 820. However, once there are no additional data blocks to back up (shown as the negative exit from 830), the method may include updating the superblock to reflect that the data blocks have been backed up, as in 840. Note that in other embodiments, individual entries in the superblock data structure may be updated as soon as the corresponding data block is backed up, rather than after all of the data blocks targeted by the backup operation have been backed up.

Note that in some embodiments, the leader node for a given cluster may coordinate the backup and/or restore processes to ensure consistency across the nodes of the cluster. For example, in some embodiments, the superblocks of all of the nodes in a cluster may be versioned in lock-step when any updates to the cluster are committed, whether or not updates were made on all of the nodes in the cluster. In other words, a commit of any update operation in the cluster may cause an update of a version number (or other version identifier) of all of the superblocks on the nodes of the cluster to the same value. In some such embodiments, when a backup operation is initiated, the leader node may be configured to ensure that all of the nodes are backing up superblocks that have the same version identifier value, and then the nodes themselves may back up the corresponding data blocks (according to the metadata stored in the superblock). Similarly, on a full cluster restore operation, the leader node may be configured to ensure that all of the nodes restore superblocks that have the same version identifier value (ideally, the version identifier value of the most recently committed superblocks), and then the nodes themselves may perform a streaming restore operations for the appropriate data blocks (according to the metadata stored in the restored superblocks). In some embodiments, however, if a superblock with the version identifier value of the most recently committed superblocks is not available on one or more of the nodes (e.g., if it has been lost or corrupted, and no valid/uncorrupted mirror copy is available in the cluster or in the remote backup storage), the leader node may be configured to ensure that all of the nodes restore superblocks that have the same previous version identifier value (i.e., the leader node may ensure that a previous consistent snapshot of the data stored in the cluster is restored).

Figure 9A:
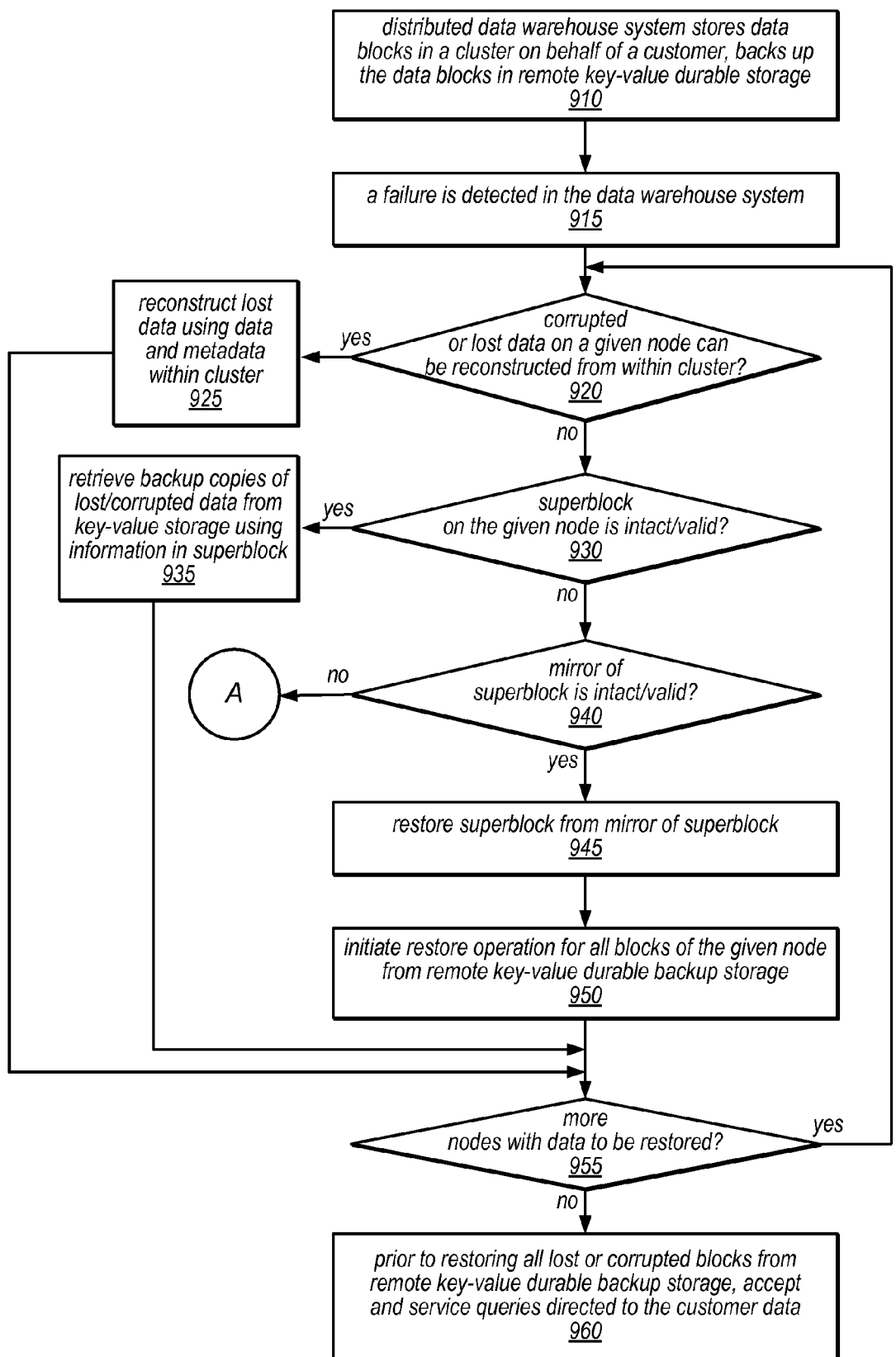
FIGS. 9A-9B depict a flow diagram illustrating one embodiment of a method for reconstructing data blocks following a failure in a distributed data warehouse system.
Figure 9B:
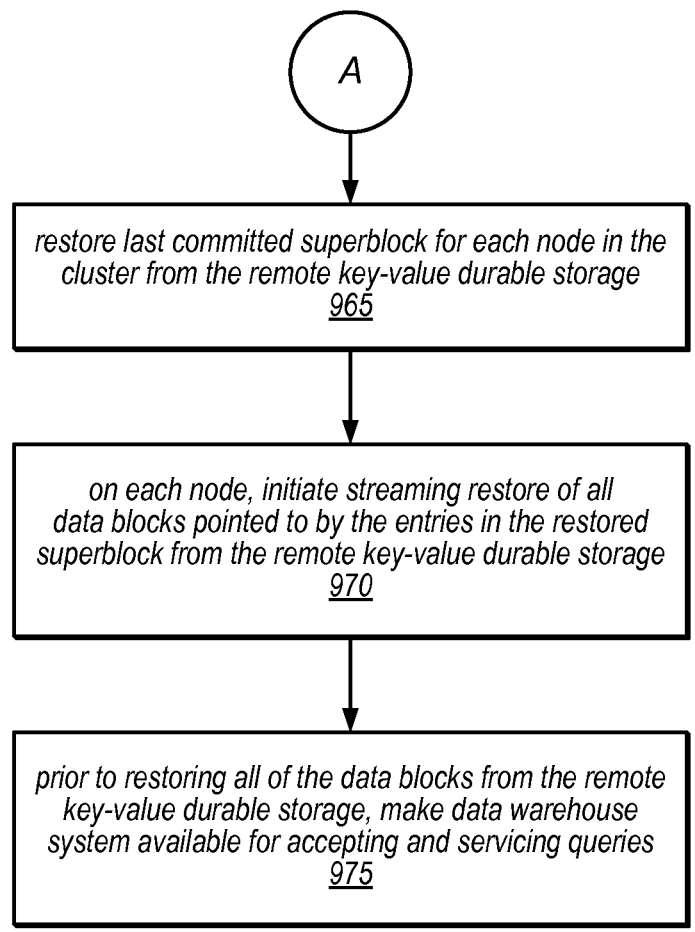

One embodiment of a method for reconstructing data blocks following a failure in a distributed data warehouse system is illustrated by the flow diagram in FIGS. 9A-9B. As illustrated at 910, in this example, the method may include a distributed data warehouse system storing data blocks in a cluster on behalf of a customer (e.g., a user, a client application, or a data warehouse service subscriber), and backing up the data blocks in a remote key-value durable storage. In this example, after detecting a failure in the data warehouse system (as in 915), the method may include determining whether any lost (or corrupted) data blocks on a given node can be reconstructed using data that is still stored (and not corrupted) within the same cluster and local metadata (e.g., a superblock of the given node stored on the given node) (as in 920). If so, shown as the positive exit from 920, the method may include reconstructing the lost (or corrupted) data blocks on the given node (or disk thereof) using data and metadata stored within the cluster (e.g., by retrieving a secondary copy of the data block, according to the metadata stored in the corresponding superblock on the given node), as in 925.

As illustrated in this example, if the lost (or corrupted) data blocks cannot be reconstructed using data and metadata that is still stored (and not corrupted) within the same cluster (shown as the negative exit from 920), the method may include determining whether the relevant superblock (i.e., the superblock for the given node, or disk thereof) is intact (i.e., is not lost or corrupted), as in 930. If the superblock is intact, shown as the positive exit from 930, the method may include retrieving backup copies of the lost/corrupted data from key-value storage using the information stored in the superblock on the given node, as in 935. If the superblock for the given node is not intact on the given node (shown as the negative exit from 930), and no mirror (copy) of the superblock for the given node is available and intact (i.e., not corrupted) within the cluster (shown as the negative exit from 940) the method may include initiating a full cluster restore operation. This is illustrated in FIG. 9A by the connection element A to FIG. 9B. Otherwise, if a mirror (copy) of the superblock for the given node is available and intact (i.e., not corrupted) within the cluster (shown as the positive exit from 940) the method may include restoring the superblock from the mirror (as in 945) and initiating a restore operation for all of the blocks of the given node (as in 950).

As illustrated in this example, If there are more nodes with data to be restored from backup (shown as the positive exit from 955), the method may include repeating the operations illustrated as 920-955 for each of the additional nodes. This is illustrated in FIG. 9A by the feedback from 955 to 920. Once there are no additional nodes with data to be restored, but prior to restoring all lost or corrupted blocks from the remote key-value durable backup storage, the method may include accepting and servicing queries directed to the customer data, as in 960.

As illustrated in this example, if an intact (valid) superblock for a given node cannot be found within the cluster (i.e., if the superblock for the given node is corrupted), the method may include initiating a restore operation on the full cluster. This is illustrated in FIG. 9B beginning after connection element A. As illustrated in this example, a full cluster restore operation may include restoring the last committed superblock for each node in the cluster from the remote key-value durable storage (as in 965), and, on each node, initiating a streaming restore operation from remote key-value durable storage for all data blocks pointed to by the entries in the restored superblock (as in 970). As in previous examples, the method may include, prior to restoring all of the data blocks of the cluster from the remote key-value durable storage, making the data warehouse system available for accepting and servicing queries (as in 975).

Note that, in various embodiments, the system may be taken live (i.e., made available for processing query requests received from clients) at any point after beginning the restore operation and retrieving the superblock data structures that store information about the lost data blocks (e.g., if those superblock data structures are not intact following the detected failure), or it may remain live even in the face of the detected failure (e.g., if the superblock data structures that store information about the lost data blocks remain intact following the detected failure). In other words, in various embodiments, the systems and method described herein may allow a distributed data warehouse system to accept and service queries directed to the customer data it stores following a failure in the system prior to restoring all of the affected data blocks from the remote key-value durable backup storage.

In some embodiments, when reading a data block maintained by the data warehouse system, the system itself may be configured to automatically determine whether to access one of the copies of the data block stored in a disk in a cluster in the data warehouse system (e.g., a primary or secondary copy of the data block) or to access the backup copy of the data block stored in the remote backup storage system. In some embodiments, this determination may include performing a consistency check when a data block is read from a disk in the cluster to evaluate whether the data block has encountered physical or logical corruption. For example, if the primary copy of the data block has been corrupted, the data block may be read from its secondary location. If the secondary copy if also unavailable (e.g., due to any of a variety of reasons, including those described herein), the most recent version of this single data block may be automatically retrieved from backup storage and patched into the running system, without requiring the client to know the identification or location of the backup copy and without requiring restoration of any other data block.

Figure 10:
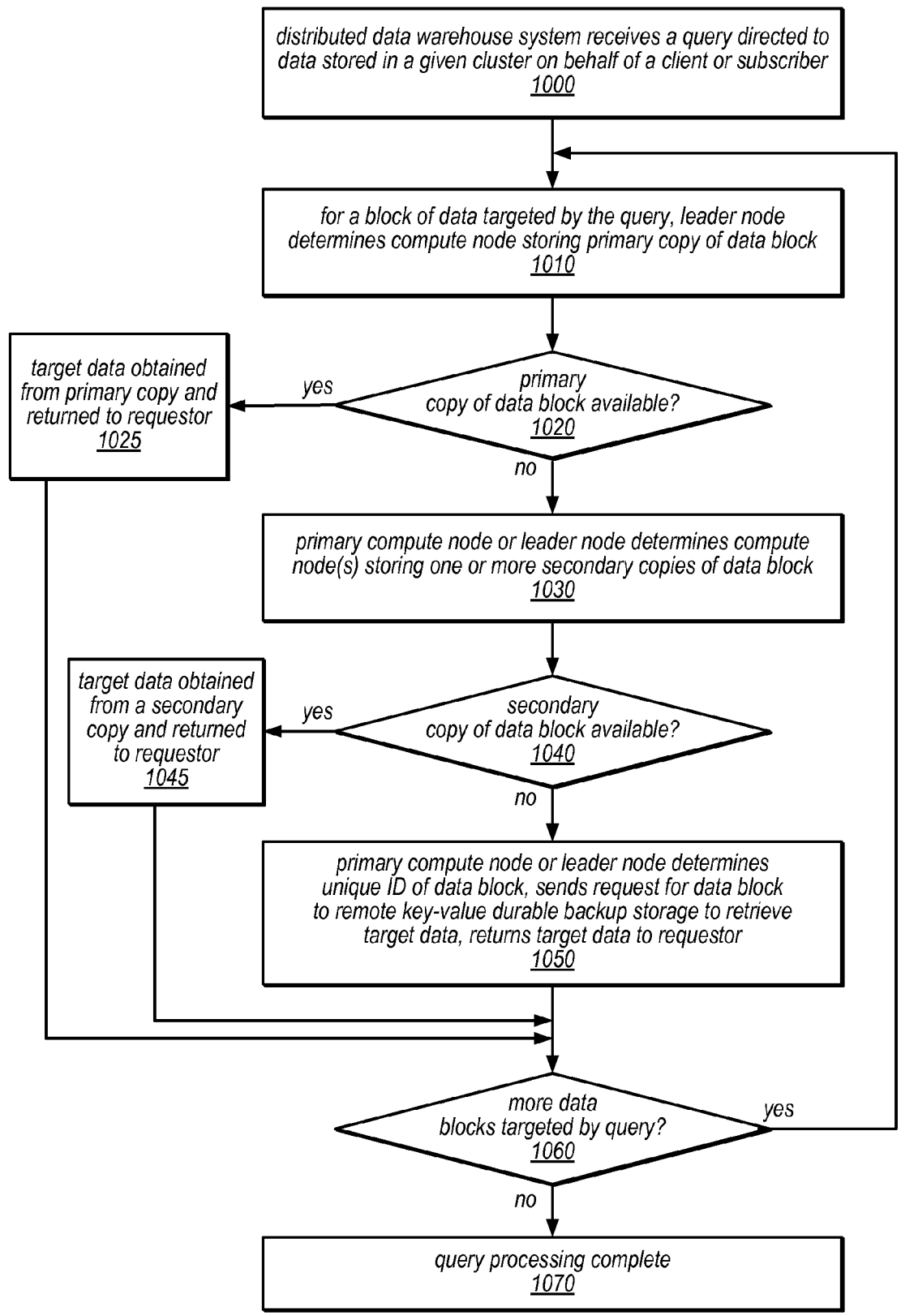
FIG. 10 is a flow diagram illustrating one embodiment of a method for responding to a query request in a distributed data warehouse system.

One embodiment of a method for responding to a query request in a distributed data warehouse system is illustrated by the flow diagram in FIG. 10. As illustrated at 1000, in this example, the method may include a distributed data warehouse system receiving a query directed to data stored in a given cluster on behalf of a client or subscriber. In response to receiving the query, the method may include, for a block of data targeted by the query, the leader node of the given cluster determining the compute node that currently stores the primary copy of data block, as in 1010. If the primary copy of data block is available (e.g., for at least partially satisfying the query), shown as the positive exit from 1020, the method may include obtaining the target data from the primary copy of the data block and returning it to the requestor, as in 1025.

If the primary copy of data block is not available (e.g., due to physical or logical corruption, a software bug, a memory issue in the I/O pathway, a disk failure, a node failure, or because it has yet to be restored following corruption or a failure), the method may include the primary compute node or the leader node determining the compute node(s) that store one or more secondary copies of the data block, as in 1030. If a secondary copy of the data block is available (shown as the positive exit from 1040), the method may include obtaining the target data from the secondary copy of the data block and returning it to the requestor, as in 1045. If no secondary copy of the data block is available (shown as the negative exit from 1040), the method may include the leader node or the primary compute node determining the unique ID of the data block (e.g., based on metadata stored in a superblock data structure of a node on which the data block was previously stored), sending a request for the data block to a remote key-value durable backup storage system to retrieve the target data, and returning the target data to the requestor, as in 1050. If there are more data blocks targeted by the received query (shown as the positive exit from 1060), the method may include repeating the operations illustrated at 1010 to 1050 for those additional data blocks. This is illustrated in FIG. 10 by the feedback from 1060 to 1010. Once there are no additional data blocks targeted by the received query, shown as the negative exit from 1060, the query processing may be complete, as in 1070. Note that the operations illustrated in FIG. 10 for determining which of several copies of a targeted data block to access in order to respond to a query may be performed automatically (e.g., without user intervention) in the distributed data warehouse system.

Figure 11:
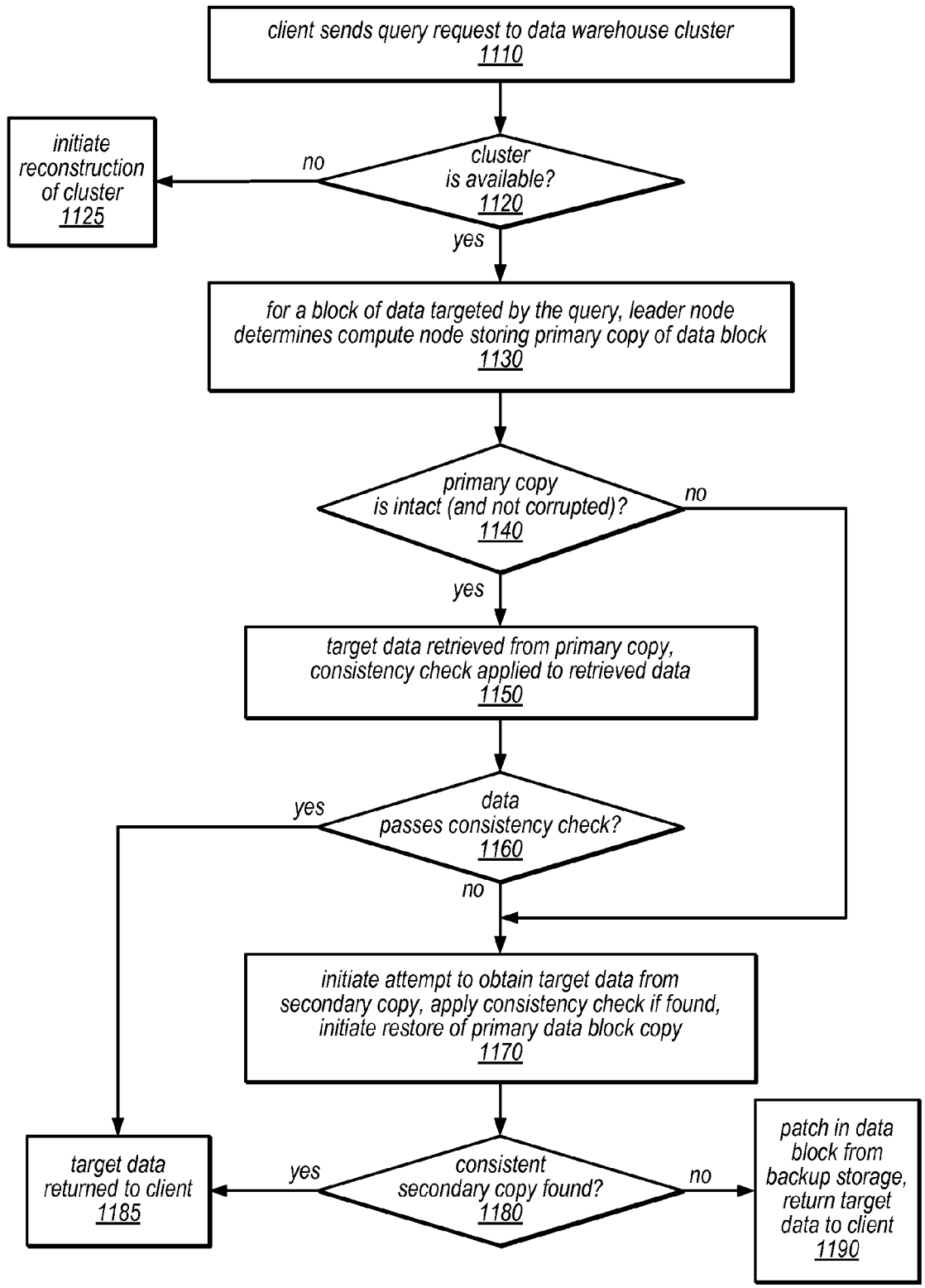
FIG. 11 is a flow diagram illustrating one embodiment of a method for determining which of the copies of a data block to return in response to a query.

One embodiment of a method for determining which of the copies of a data block to return in response to a query is illustrated by the flow diagram in FIG. 11. As illustrated at 1110, in this example, the method may include a client sending a query request to a data warehouse cluster. If the cluster is not available (shown as the negative exit from 1120), the method may include initiating the reconstruction of the cluster, as in 1125 before re-attempting to satisfy the query (not shown). For example, the method may include initiating a background process for restoring the entire cluster from backup copies of the data stored in the remote key-value durable backup storage system. As described herein, in some embodiments, rather than waiting for the entire cluster (or even the targeted data block) to be restored before re-attempting to satisfy the query, a backup copy of the targeted data block may be retrieved from the remote key-value durable backup storage system by a foreground process that retrieves data blocks targeted by the query. If the cluster is available (shown as the positive exit from 1120), the method may include, for a block of data targeted by the query, the leader node determining a compute node that stores a primary copy of the data block, as in 1130. If the primary copy of the data block is not intact (e.g., if it is lost or corrupted, shown as the negative exit from 1140), the method may include initiating an attempt to obtain the target data from a secondary copy of the data block, applying a consistency check to the obtained data (if found), and/or initiating the restore of the primary data block copy from the secondary copy (as in 1170).

As illustrated in this example, if the primary copy of the targeted data is intact and not corrupted (shown as the positive exit from 1140), the method may include retrieving the target data from the primary copy of the data block, and applying a consistency check to the retrieved data, as in 1150. If the retrieved data passes the consistency check (shown as the positive exit from 1160), the method may include returning the target data to the client (as in 1185).

If the retrieved data does not pass the consistency check (shown as the negative exit from 1160) the method may include initiating an attempt to obtain the target data from a secondary copy of the data block, applying a consistency check to the obtained data (if found), and/or initiating the restore of the primary data block copy from the secondary copy (as in 1170). If a consistent secondary copy of the data block is found (shown as the positive exit from 1180), the method may include returning the target data to the client, as in 1185. If no consistent secondary copy of the data block is found (shown as the negative exit from 1180), the method may include patching in a copy of data block from the backup storage system (e.g., a remote key-value durable backup storage system) and returning the target data to the client, as in 1190. Note that various ones of the operations illustrated at 1130-1190 may be repeated for any other data blocks in which data targeted by the query is stored (not shown), but it may not be necessary to restore or even scan all of the data blocks of a disk, node, or cluster stored in the backup storage system in order to retrieve data from the backup storage system that is needed to satisfy a query. Note also that the operations illustrated in FIG. 11 for determining which of several copies of a targeted data block to return to a client in response to a query may be performed automatically (e.g., without intervention by a system administrator or other user) in the distributed data warehouse system.

Figure 12:
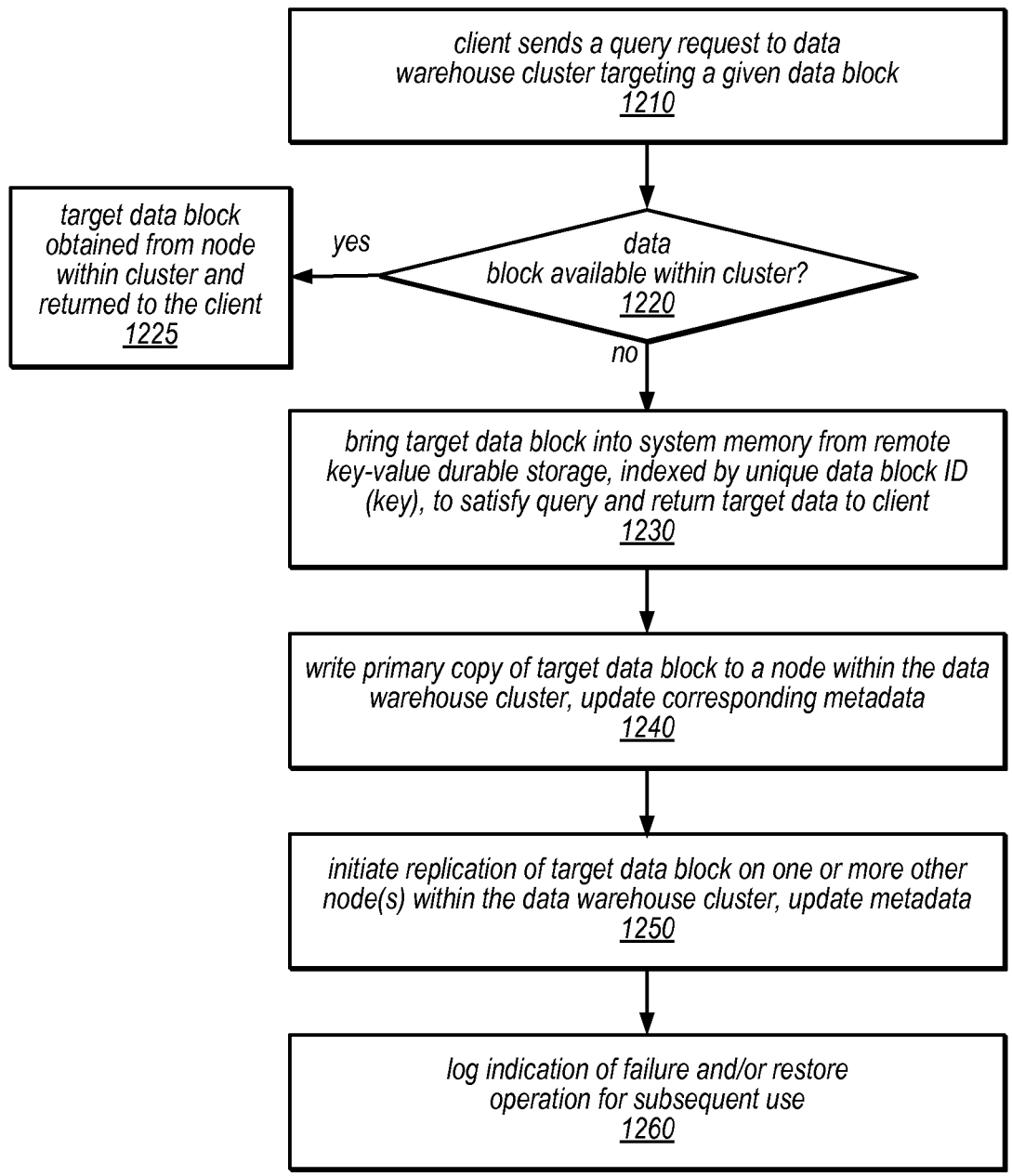
FIG. 12 is a flow diagram illustrating one embodiment of a method for patching in a backup copy of a data block from a remote key-value durable storage system to satisfy a query.

One embodiment of a method for patching in a backup copy of a data block from a remote key-value durable storage system to satisfy a query is illustrated by the flow diagram in FIG. 12. As illustrated at 1210, in this example, the method may include a client sending a query request to a data warehouse cluster targeting a given data block. If the target data block is available within the cluster (shown as the positive exit from 1220), the method may include obtaining the target data block from a node within the cluster (e.g., a node on which a primary or secondary copy of the target data block is stored), and returning the target data block (or a requested portion thereof) to the client, as in 1225. If, for any of a variety of reasons (e.g., due to physical or logical corruption, a software bug, a memory issue in the I/O pathway, a disk failure, a node failure, or any other reason), the target data block is not available within the cluster (shown as the negative exit from 1220), the method may include bringing the target data block into system memory from a remote key-value durable storage system (indexed by a unique data block identifier that serves as its access key in the remote key-value durable storage system) to satisfy the query, and returning the target data block (or a requested portion thereof) to the client, as in 1230. In other words, the target data block may be "faulted in" (in a manner similar to that employed following a page fault) to satisfy a query request without having to scan data or restore more than that target data block.

As illustrated in this example, once the target data block has been brought into system memory, the method may include writing a primary copy of the target data block to a node within the data warehouse cluster, and updating the appropriate metadata accordingly (e.g., updating the metadata in the superblock data structure for that node to reflect the current state and/or location of the data block in the node), as in 1240. The method may also include initiating the replication of the target data block on one or more other nodes within the data warehouse cluster (in other words, it may include the node on which the primary copy is stored creating one or more secondary copies of the data block), and updating the appropriate metadata accordingly, as in 1250. In various embodiments, the metadata for the primary and/or secondary copies of the restored data block may be the same or different than the metadata for the primary and/or secondary copies of the corrupted data blocks that they replace (e.g., depending on whether they are stored on the same or different disks and/or nodes than those on which the copies of the corrupted data block were previously stored). As illustrated in this example, in some embodiments the method may include logging an indication of (or other information about) any failure in the system that triggered the restore operation and/or an indication of (or other information about) the restore operation itself for subsequent use, as in 1260. For example, in some embodiments, such information (which may be logged for other such failures or conditions/events that result in a consistent and uncorrupted copy of various data blocks not being available in the data warehouse cluster) may be subsequently accessed (e.g., in a file or data structure in which it was recorded) when performing failure analysis, trend analysis, routine or targeted maintenance, or other functions.

Note that in other embodiments, after the target data is brought into system memory from a remote key-value durable storage system to satisfy the query and is returned to the client (as in 1230), the target data may be discarded, rather than written to disk. In some such embodiments, primary and secondary copies of a lost or corrupted data block may not be written to disk by a foreground process that retrieves data blocks from backup storage in order to satisfy a query, but only by a background process that performs a streaming restore operation for an entire disk, node, or cluster. Note also that, in some embodiments, if a query request targets data in more than one data block, the operations illustrated in FIG. 12 may be repeated in order to locate and return all of the data needed to satisfy the query request, which may include "faulting in" one or more additional data blocks from the remote key-value durable storage system and/or restoring them in the data warehouse cluster (whether by a foreground process servicing the query request or by a subsequent background process). In embodiments in which multiple data blocks are restored in the data warehouse cluster by a background process, the order in which the data blocks are restored may be dependent on the relative likelihood that they will be access again in the near future, as described in more detail below.

As previously noted, in some embodiments, data blocks may be restored from a remote storage system in an order reflecting the likelihood (or expected likelihood) that they will be accessed in the near future. In different embodiments, different schemes may be used to track the recentness and/or relevance of various data blocks in order influence the prioritization of blocks for a streaming restore operation. In some embodiments, data blocks may be restored based on such a determined prioritization using a background process while a foreground process streams in data blocks from backup storage on an as needed basis to satisfy incoming queries. Note that in other systems, many (or most) other processes must run in a degraded state until an entire failed (or corrupted) disk or node is rebuilt. In some embodiments, the systems described herein may implement a more graceful degradation during restore operations. In other words, prioritizing the retrievals to be performed by the background process, as described herein, may allow them be sequenced in such a way that they minimize the perceived degradation in system performance due to the restore process (e.g., by reconstructing more frequently accessed data before reconstructing less frequently accessed data).

Figure 13:
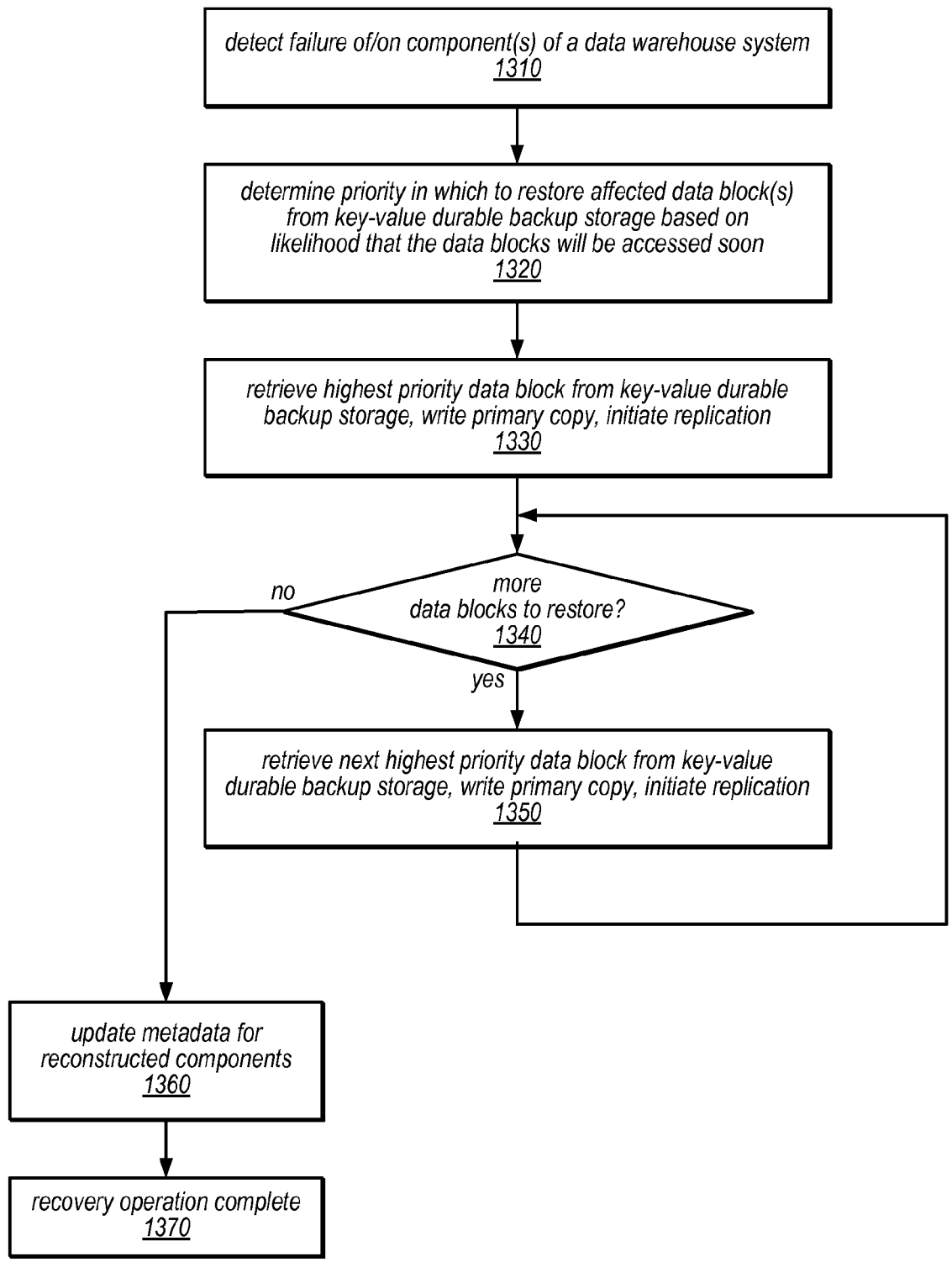
FIG. 13 is a flow diagram illustrating one embodiment of a method for restoring data blocks in a distributed data warehouse system from a remote key-value durable storage system in priority order.

One embodiment of a method for restoring data blocks from a remote key-value durable storage system in priority order is illustrated by the flow diagram in FIG. 13. As illustrated at 1310, in this example, the method may include detecting a failure of (or a failure on) one or more components of a data warehouse system. In response, an operation to restore affected data (e.g., data that cannot be restored from unaffected data remaining in the data warehouse system) may be initiated. As illustrated in this example, the method may include determining the priority in which to restore the affected data blocks from key-value durable backup storage based on a determination of the relative likelihood that each of the data blocks will be accessed in the near future, as in 1320. As described in more detail below, various criteria may be applied to determining a priority order for restoring the affected data blocks, including, but not limited to: sequencing them in an order such that the data blocks that were most recently the targets of queries are restored first, such that the data blocks that were most recently written are restored first, or such that the data blocks that were most recently backed up are restored first.

Once the order in which to restore the affected data block has been determined, the method may include retrieving the highest priority data block from key-value durable backup storage (e.g., streaming it into system memory in the data warehouse system), writing a primary copy of the data block in the data warehouse system, and initiating the replication of the data block in the data warehouse system (e.g., to create one or more secondary copies of the data block), as in 1330. Note that streaming the data block into system memory prior to writing the primary and secondary copies to disk may make it possible to respond to queries that target that data faster (e.g., from a faster memory) then when the data must be retrieved from a disk in the cluster or from backup storage). If there are more data blocks to restore (shown as the positive exit from 1340), the method may include retrieving the next highest priority data block from key-value durable backup storage, writing a primary copy of the next highest priority data block in the data warehouse system, and initiating a replication of the next highest priority data block, as in 1350. As illustrated in FIG. 13, the operations illustrated at 1340 and 1350 may be repeated until all of the data blocks to be restored in this restore operation (e.g., all of the data blocks affected by the detected failure or failures) have been restored (shown as the negative exit from 1340). The method may also include updating the appropriate metadata for the reconstructed components (e.g., in the superblock for each node), as in 1360, and at that point, the recovery operation may be complete, as in 1370. Note that in other embodiments, individual entries in the superblock data structure may be updated as soon as the corresponding data block is reconstructed, rather than after all of the data blocks targeted by the restore operation have been reconstructed.

In some embodiments, when performing a streaming restore from remote backup storage, there may a significant benefit to sequencing the restoration of data blocks such that they align with the likelihood of access by incoming queries. In some embodiments, data blocks may be prioritized for restoration based on how recently and/or how often they have been accessed in the distributed data warehouse. For example, in a data warehouse containing data stored over a period of three years in which most queries access data that was stored within the last week, bringing the data blocks stored within the last week and data blocks that are related to those data blocks (e.g., data for facts and all dimension tables that are joined to the fact table) into system memory first may allow the system to respond to most queries prior to restoring all of the data in the data set. In this example, a typical distribution of queries directed to the data set may perform efficiently once less than 1% of the data is brought in from backup storage.

In some embodiments, data blocks that include time series data may be prioritized such that the data blocks storing the newest data are restored first. In some embodiments, data blocks storing more recently created (or updated) data may be prioritized over data blocks that store older data, regardless of the type of data they store. In other embodiments, the restore operation may prioritize data blocks representing the most recently loaded database tables first, under the assumption that tables that have just been loaded into the system will be either queried or sorted sooner than data blocks storing other table data. In still other embodiments, data blocks may be prioritized for restoration based on an analysis of recent query patterns. For example, if there is any skew in the access pattern for data blocks, that access pattern may be followed when restoring data blocks from backup storage. In some embodiments, recently run queries may be examined to see which data blocks they accessed and/or to determine historical access patterns of a large number of previous queries. For example, a query history may be maintained by the data warehouse system (e.g., in a log or table) and an analysis of that history may be performed to determine which tables and/or columns of data are most frequently queried. The data blocks storing the columnar data that is most frequently queried may be prioritized for restoration. In some embodiments, the prioritization of data blocks for restoration may by a dynamic prioritization based on current activity. For example, when data blocks are patched into the data warehouse system from backup storage in order to satisfy current queries, the priority of any remaining to-be-restored data blocks that store data for the same columns as the data blocks that have been patched in may be increased.

In some embodiments, the superblock data structures described herein may be augmented with one or more counters per entry (i.e., per data block) whose values reflect the number of times the corresponding data block has been accessed with a given period. For example, each of the superblock data structures may include a current access period counter and a previous access period counter. On each data block access, the current access period counter may be updated. From time to time (e.g., periodically or in response to certain events, such as backup or restore operations), the count value of the current access period counter may be moved to previous access period counter (overwriting its previous value), and the value of the current access period counter may be reset (e.g., to a value of zero). In some embodiments, when new blocks are created, their superblock data structures may be initialized to include an average or median current access period counter value, indicating that they are fairly likely to be accessed (e.g., so that they are not unfairly penalized relative to other data blocks). In other embodiments, the current access period counter value for new blocks may be initialized to a default value (e.g., 20% of the maximum count value). In some embodiments, a sorting operation on a data block may reset the counters for all affected data blocks to an initial value or to a default value.

In this example, for a restore operation, data blocks may be sorted based on the sum of the current access period counter value and the previous access period counter value (from the highest sum to the lowest sum). In another example, data blocks may be sorted based on a weighted average or a weighted sum of the current access period counter value and the previous access period counter value (e.g., one-half the previous access period counter value plus the current access period counter value). In general, data blocks may be sorted based on a value that represents a logical combination and/or a mathematical combination of the values of their current access period counters and their previous access period counters, in different embodiments.

Figure 14:
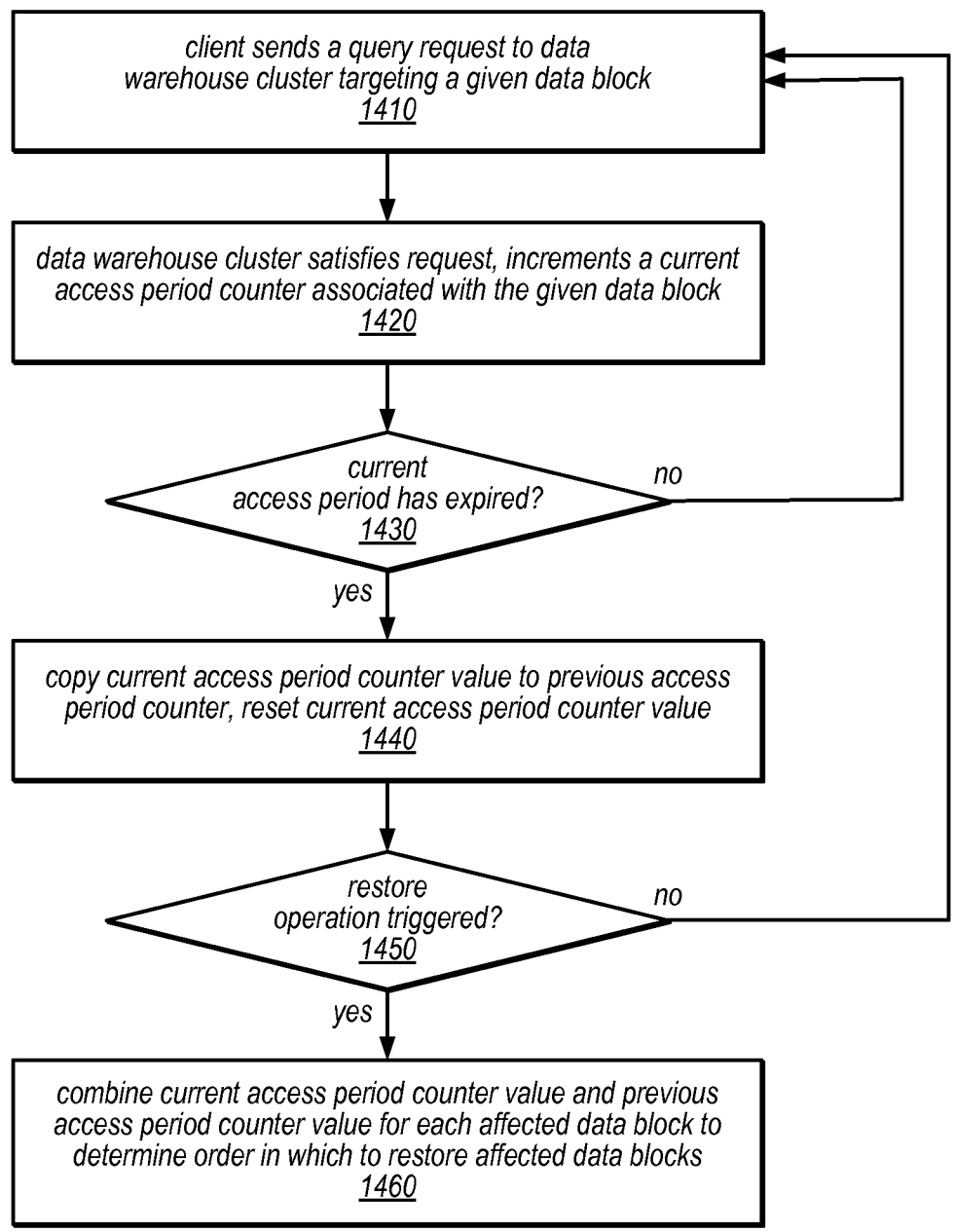
FIG. 14 is a flow diagram illustrating one embodiment of a method for determining the order in which to restore data blocks from key-value durable backup storage.

One embodiment of a method for determining the order in which to restore data blocks from key-value durable backup storage is illustrated by the flow diagram in FIG. 14. As illustrated at 1410, in this example, the method may include a client sending a query request to a data warehouse cluster targeting a given data block. As illustrated in this example, the method may include the data warehouse cluster satisfying the request and incrementing a current access period counter associated with the given data block to reflect the fact that the given data block has been accessed, as in 1420. If the current access period (e.g., the current period during which a count of accesses is being captured by the current access period counter) has not yet expired (shown as the negative exit from 1430), the method may include continuing to count accesses to the given data block and/or one or more other data blocks (using different current access period counters associated with those other data blocks). This is illustrated in FIG. 14 by the feedback from the negative exit of 1430 to 1410. If (or when) the current access period expires (shown as the positive exit from 1430), the method may include copying the current access period counter value to a previous access period counter (e.g., overriding the value of the counter), and resetting the value of the current access period counter to an initial or default value, as in 1440.

As illustrated in this example, the method may include continuing to count accesses to the given data block and/or one or more other data blocks (using different current access period counters associated with those other data blocks) until or unless something triggers a restore operation. This is illustrated in FIG. 14 by the feedback from the negative exit of 1450 to 1410. Note that in some embodiments, a restore operation may be triggered in response to detecting a failure of a disk, node, or cluster, in response to a query targeting data that is not available (or for which a consistent and uncorrupted copy is not available in the cluster), or in response to an explicit request from a client (e.g., a user, client application, or storage service subscriber) to do so. Once a restore operation is triggered (shown as the positive exit from 1450), the method may include combining the current access period counter value and the previous access period counter value for each affected data block to determine the order in which to restore the affected data blocks, as in 1460. For example, in different embodiments, the sum of these two counter values (for each data block) may be used to determine the order in which the data blocks should be restored (e.g., such that data blocks that have been accessed more times in the two most recent periods for which access counts have been captured will be restored sooner than data blocks that have been accessed fewer times.

In some embodiments, the data warehouse systems described herein may implement workload management mechanisms that allow clients to flexibly manage the priorities of workloads, and, in particular, allow for classification of workloads, so that quick, fast-running queries may not get stuck in queues behind long-running queries (e.g., a short query bias). In some embodiments, the data warehouse systems may implement customizable query service classes that provide additional criteria for query classification and a high-level workload manager component manages queries, assigns them to service classes. In such embodiments, for each service class, the data warehouse systems may provide a query queue that maintains a prioritized list of queries waiting for execution. In addition, the data warehouse system may provide a task pool that defines the number of queries within a pool that can be run concurrently (as long as compute node processes are available to run them).

In some embodiments, the data warehouse systems described herein may use massively-parallel processing (MPP) infrastructure to provide fast execution of the most complex queries operating on large amounts of data in a database. Using off-the-shelf standard server components, the data warehouse systems may provide near-linear scalability to boost performance simply by adding more "compute node" servers (with multi-core processors) to handle more demanding workloads. All query processing (except final result aggregation) may be done by the compute nodes with each core of every node executing the same compiled query "segments" on smaller portions of the entire data.

In addition, the data warehouse systems may use columnar-oriented data storage and compression to reduce storage requirements (thereby also reducing disk I/O) and to perform more in-memory processing of queries. Fully optimized and compiled code may be distributed across all of the nodes of a data warehouse system cluster to "divide and conquer" and to increase the execution speed of complex queries while also eliminating the overhead of using an interpreter.

In some embodiments, the data warehouse systems described herein may provide a highly-efficient query optimizer and a query execution engine that is MPP-aware and that also takes advantage of the columnar-oriented data storage used by the data warehouse systems. The query optimizer of the data warehouse systems may provide a collection of reusable software components and methods central to query execution with significant enhancements and extensions for processing complex analytic queries including multi-table joins, sub-queries, and aggregation. As previously noted, the use of columnar storage and adaptive compression may also significantly reduce the amount of data needed in processing queries and may dramatically improve query execution speed through in-memory and cached data access whenever possible.

The methods described herein may in various embodiments be implemented by any combination of hardware and software. For example, in one embodiment, the methods may be implemented by a computer system that includes a processor executing program instructions stored on a computer-readable storage medium coupled to the processor. The program instructions may be configured to implement the functionality described herein (e.g., the functionality of various servers and other components that implement the data warehouse systems and/or remote key-value durable backup storage systems described herein).

Figure 15:
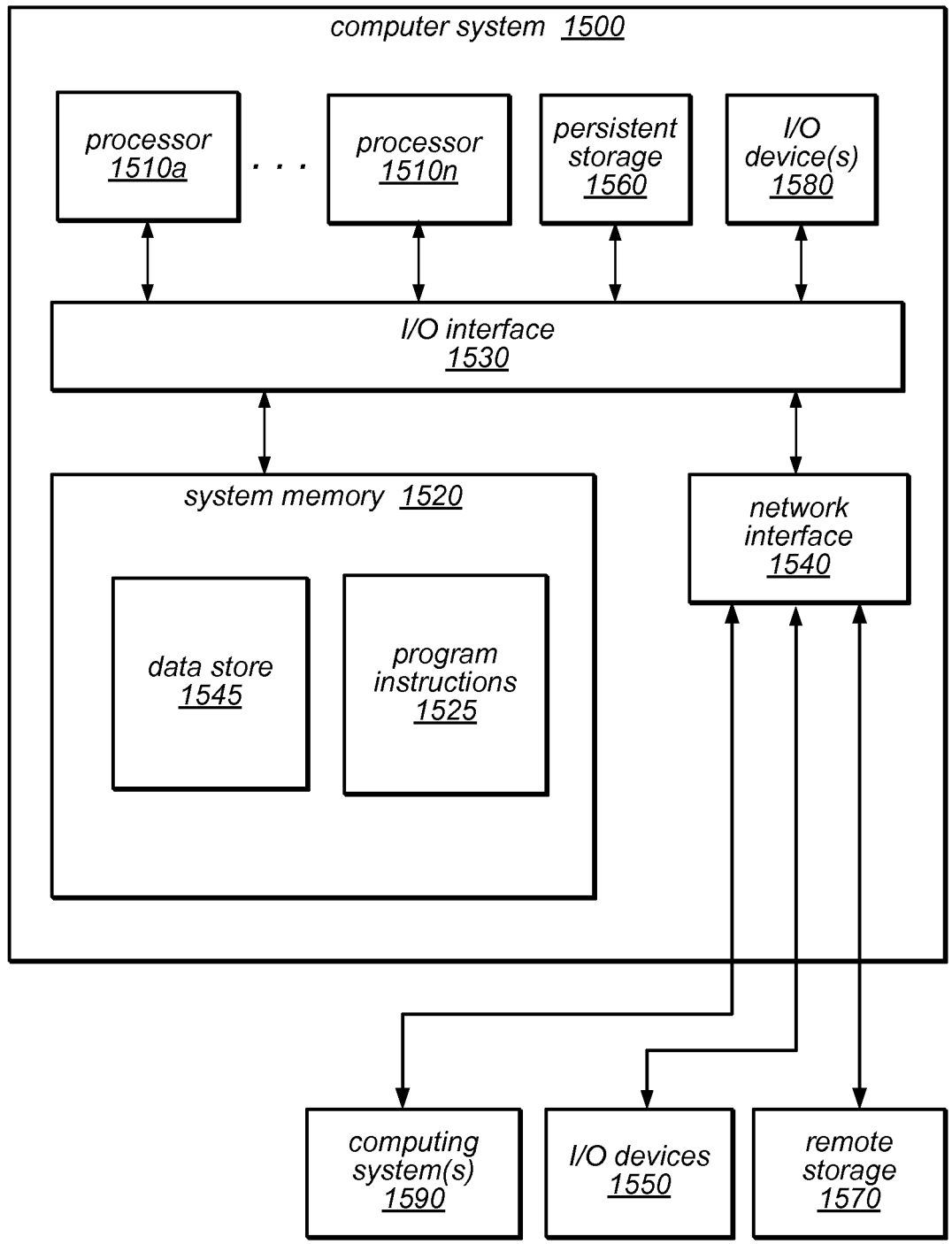
FIG. 15 is a block diagram illustrating a computer system configured to implement at least a portion of a distributed data warehouse system and a corresponding key-value durable backup storage system, according to various embodiments.

FIG. 15 is a block diagram illustrating a computer system configured to implement at least a portion of a distributed data warehouse system and a corresponding key-value durable backup storage system, according to various embodiments. For example, computer system 1500 may be configured to implement a leader node of a cluster in a distributed data warehouse system, a compute node of a cluster in a distributed data warehouse system, a distributed data warehouse service manager, a key-value durable backup storage system (or an interface thereof), or any other component of a distributed data warehouse system or a corresponding key-value durable backup storage system. Computer system 1500 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1500 includes one or more processors 1510 (any of which may include multiple cores, which may be single or multi-threaded) coupled to a system memory 1520 via an input/output (I/O) interface 1530. Computer system 1500 further includes a network interface 1540 coupled to I/O interface 1530. In various embodiments, computer system 1500 may be a uniprocessor system including one processor 1510, or a multiprocessor system including several processors 1510 (e.g., two, four, eight, or another suitable number). Processors 1510 may be any suitable processors capable of executing instructions. For example, in various embodiments, processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA. The computer system 1500 also includes one or more network communication devices (e.g., network interface 1540) for communicating with other systems and/or components over a communications network (e.g. Internet, LAN, etc.). For example, a client application executing on system 1500 may use network interface 1540 to communicate with a server application executing on a single server or on a cluster of servers that implement a distributed system. In another example, an instance of a server application executing on computer system 1500 may use network interface 1540 to communicate with other instances of the server application that may be implemented on other computer systems.

In the illustrated embodiment, computer system 1500 also includes one or more persistent storage devices 1560 and/or one or more I/O devices 1580. In various embodiments, persistent storage devices 1560 may correspond to disk drives, tape drives, solid state memory, other mass storage devices, or any other persistent storage device. Computer system 1500 (or a distributed application or operating system operating thereon) may store instructions and/or data in persistent storage devices 1560, as desired, and may retrieve the stored instruction and/or data as needed.

Computer system 1500 includes one or more system memories 1520 that are configured to store instructions and data accessible by processor 1510. In various embodiments, system memories 1520 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1520 may contain program instructions 1525 that are executable by processor(s) 1510 to implement the methods and techniques described herein. In various embodiments, program instructions 1525 may be encoded in platform native binary, any interpreted language such as Java™ byte-code, or in any other language such as C/C++, Java™, etc., or in any combination thereof. For example, in the illustrated embodiment, program instructions 1525 include program instructions executable to implement the functionality of a leader node of a cluster in a distributed data warehouse system, a compute node of a cluster in a distributed data warehouse system, a distributed data warehouse service manager, a key-value durable backup storage system (or an interface thereof), or any other component of a distributed data warehouse system or a corresponding key-value durable backup storage system. In some embodiments, program instructions 1525 may implement multiple separate clients, server nodes, and/or other components.

In some embodiments, program instructions 1525 may include instructions executable to implement an operating system (not shown), which may be any of various operating systems, such as UNIX, LINUX, Solaris™, MacOS™, Windows™, etc. Any or all of program instructions 1525 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1500 via I/O interface 1530. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1500 as system memory 1520 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1540.

In some embodiments, system memory 1520 may include data store 1545, which may be configured as described herein. For example, the information described herein as being stored by the data warehouse system (e.g., on a leader node or a compute node), such as a superblock data structure, one or more data block access counters, a query history, an error log, or other information used in performing the methods described herein may be stored in data store 1545 or in another portion of system memory 1520 on one or more nodes, in persistent storage 1560, and/or on one or more remote storage devices 1570, in various embodiments. In some embodiments, and at various times, system memory 1520 (e.g., data store 1545 within system memory 1520), persistent storage 1560, and/or remote storage 1570 may store primary copies of data blocks, secondary copies (i.e., replicas) of data blocks, backup copies of data blocks, metadata associated with data blocks and/or their state, database configuration information, and/or any other information usable in implementing the methods and techniques described herein.

In one embodiment, I/O interface 1530 may be configured to coordinate I/O traffic between processor 1510, system memory 1520 and any peripheral devices in the system, including through network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments, some or all of the functionality of I/O interface 1530, such as an interface to system memory 1520, may be incorporated directly into processor 1510.

Network interface 1540 may be configured to allow data to be exchanged between computer system 1500 and other devices attached to a network, such as other computer systems 1590 (which may implement one or more server nodes and/or clients of the distributed data warehouse system and/or a remote key-value durable storage system), for example. In addition, network interface 1540 may be configured to allow communication between computer system 1500 and various I/O devices 1550 and/or remote storage 1570. Input/output devices 1550 may, in some embodiments, include one or more display terminals, keyboards, keypads, touchpads, scanning devices, voice or optical recognition devices, or any other devices suitable for entering or retrieving data by one or more computer systems 1500. Multiple input/output devices 1550 may be present in computer system 1500 or may be distributed on various nodes of a distributed system that includes computer system 1500. In some embodiments, similar input/output devices may be separate from computer system 1500 and may interact with one or more nodes of a distributed system that includes computer system 1500 through a wired or wireless connection, such as over network interface 1540. Network interface 1540 may commonly support one or more wireless networking protocols (e.g., Wi-Fi/IEEE 802.11, or another wireless networking standard). However, in various embodiments, network interface 1540 may support communication via any suitable wired or wireless general data networks, such as other types of Ethernet networks, for example. Additionally, network interface 1540 may support communication via telecommunications/telephony networks such as analog voice networks or digital fiber communications networks, via storage area networks such as Fibre Channel SANs, or via any other suitable type of network and/or protocol. In various embodiments, computer system 1500 may include more, fewer, or different components than those illustrated in FIG. 15 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, leader nodes within a data warehouse system may present data storage services and/or database services to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A method, comprising:
performing, by one or more computers:
storing columnar data of a database table in a plurality of physical data blocks in a distributed data storage system on behalf of one or more clients, wherein the distributed data storage system comprises a cluster of nodes, each of which comprises one or more disks on which a plurality of physical data blocks are stored, wherein each of the plurality of physical data blocks is associated with a respective unique identifier, and wherein said storing columnar data comprises storing two or more copies of each portion of the columnar data in different physical data blocks in the distributed data storage system;
storing a backup copy of each of the plurality of physical data blocks in a remote key-value durable backup storage system, wherein for each of the plurality of physical data blocks, the respective unique identifier serves as a key to access a data block that includes the backup copy in the remote key-value durable backup storage system, and wherein the remote key-value durable backup storage system employs a different data storage format than the distributed data storage system;
receiving, from a client, a query to access a portion of the columnar data stored in the distributed data storage system;
in response to said receiving:
accessing one of the plurality of physical data blocks in the distributed data storage system in which a copy of the portion of the columnar data is stored;
applying a consistency check to the one of the plurality of physical data blocks;
determining, based, at least in part, on said applying, that data on the one of the plurality of physical data blocks is corrupted or inconsistent with other ones of the plurality of physical data blocks;
in response to said determining that the data on the one of the plurality of physical data blocks is corrupted or inconsistent with the other ones of the plurality of physical data blocks, automatically retrieving the backup copy of the one of the plurality of physical data blocks stored in the remote key-value durable backup storage system that employs the different data storage format than the distributed data storage system, wherein said retrieving comprises using the unique identifier for the one of the plurality of data blocks as the key to access the backup copy of the one of the plurality of physical data blocks in the remote key-value durable backup storage system; and
satisfying the query, wherein said satisfying the query comprises returning at least a portion of the data in the retrieved backup copy of the one of the plurality of physical data blocks to the client during an operation to restore the one of the plurality of physical data blocks.

2. The method of claim 1,
wherein said storing columnar data comprises storing one primary copy and one or more secondary copies of each portion of the columnar data; and
wherein said accessing one of the plurality of physical data blocks comprises accessing a second data block in which a secondary copy of the portion of the columnar data is stored in response to determining that a first data block in which the primary copy of the portion of the columnar data is stored is corrupted or inconsistent with other ones of the plurality of physical data blocks.

3. The method of claim 1, wherein said retrieving the backup copy of the one of the plurality of physical data blocks comprises copying the data stored in the backup copy of the one of the plurality of physical data blocks from the key-value durable backup storage system to system memory in the distributed data storage system while a separate background process copies one or more backup copies of physical data blocks from the key-value durable backup storage system to one or more disks of the cluster of nodes in the distributed data storage system.

4. The method of claim 1, further comprising:
subsequent to said retrieving the backup copy of the one of the plurality of physical data blocks, initiating the operation to restore the one of the plurality of physical data blocks in the distributed data storage system, wherein restoring the one of the plurality of physical data blocks comprises storing one primary copy and one or more secondary copies of the portion of the columnar data in the backup copy of the one of the plurality of physical data blocks to one or more disks of the cluster of nodes in the distributed data storage system.

5. A method, comprising:
performing, by one or more computers:
maintaining data in a plurality of physical data blocks of a data storage system on behalf of one or more clients;
receiving a request to access a portion of the data;
in response to said receiving:
determining that an uncorrupted copy of the portion of the data is not available in the data storage system;
in response to determining that the uncorrupted copy of the portion of the data is not available in the data storage system, retrieving a backup copy of the portion of the data from a key-value storage system that is separate from the data storage system, wherein the key-value storage system employs a different data storage format than the data storage system; and
returning a response to the request during an operation to restore a corrupted copy of the portion of the data, the response comprising the retrieved backup copy of the portion of the data.

6. The method of claim 5, wherein said determining comprises:
accessing a data structure that stores information indicating one or more locations at which a respective copy of each portion of the data maintained on behalf of the one or more clients is stored in a physical data block; and
employing the data structure to locate at least one of a primary copy or a secondary copy of the portion of the data.

7. The method of claim 5, wherein said determining that the uncorrupted copy of the portion of the data is not available in the data storage system comprises determining that a copy of the portion of the data was previously corrupted and has not yet been restored.

8. The method of claim 5, wherein said determining that the uncorrupted copy of the portion of the data is not available in the data storage system comprises determining that a node or a disk on which a copy of the portion of the data was stored has failed and that the data stored on the node or the disk has not yet been restored.

9. The method of claim 5, wherein said determining comprises applying a consistency check to a physical data block in which a primary copy of the portion of the data is stored.

10. The method of claim 9, wherein said determining further comprises:
determining, based, at least in part, on said applying, that the primary copy of the portion of the data has been corrupted or is inconsistent with one or more other physical data blocks; and
applying a consistency check to a physical data block in which a secondary copy of the portion of the data is stored.

11. The method of claim 5,
wherein each physical data block in which data is maintained is associated with a unique identifier; and
wherein retrieving the backup copy of the portion of the data comprises using the respective unique identifier associated with a physical data block in which the portion of the data was stored in the data storage system as a key to access the backup copy of the physical data block in which the portion of the data was stored in the data storage system in the key-value storage system.

12. The method of claim 5, further comprising:
prior to receiving the request, backing up at least some of the plurality of physical data blocks in which the data is maintained in the data storage system on behalf of the one or more clients, wherein said backing up comprises, for each of the at least some of the plurality of physical data blocks:
sending to the key-value storage system a copy of a physical data block and a unique identifier associated with the physical data block to be used as an access key for retrieving a backup copy of the physical data block in the remote key-value storage system.

13. The method of claim 5, further comprising, for each of the plurality of physical data blocks in which the data is maintained in the data storage system on behalf of the one or more clients:
generating a unique identifier to be associated with a physical data block, the unique identifier generated when data is written to the physical data block.

14. The method of claim 5, further comprising:
receiving another request to access another portion of the data maintained in the data storage system on behalf of the one or more clients;
in response to receiving the other request:
determining that an uncorrupted copy of the other portion of the data is available in the data storage system;
in response to determining that the uncorrupted copy of the other portion of the data is available in the data storage system, returning a response to the other request, the response to the other request comprising the uncorrupted copy of the other portion of the data in the data storage system.

15. The method of claim 5, further comprising:
receiving another request to access another portion of the data maintained in the data storage system on behalf of the one or more clients;
in response to receiving the other request:
in response to determining that a primary copy of the other portion of the data in the data storage system is corrupted or inconsistent with other ones of the plurality of physical data blocks:
accessing a secondary copy of the other portion of the data in the data storage system; and
in response to determining that the secondary copy of the other portion of the data in the data storage system is uncorrupted, returning a response to the other request, the response to the other request comprising the secondary copy of the other portion of the data in the data storage system.

16. A computing system, comprising:
one or more computing nodes, each of which comprises at least one processor and a memory, wherein the one or more computing nodes are configured to collectively implement a database service; and
an interface to a remote key-value storage system;
wherein the database service is configured to:
store data on behalf of one or more subscribers to the database service in a plurality of physical data blocks on one or more storage devices, wherein each of the plurality of physical data blocks is associated with a unique identifier, wherein the remote key-value storage system employs a different data storage format than the one or more storage devices;
back up the data stored on behalf of the one or more subscribers, wherein to back up the data, the database service is configured to send to the remote key-value storage system, via the interface, a copy of each of the plurality of physical data blocks for storage in the remote key-value storage system, wherein the unique identifiers associated with the plurality of physical data blocks are access keys for retrieving backup copies of the plurality of physical data blocks in the remote key-value storage system;
receive a query directed to a portion of the data;
in response to said receiving:
determine that an uncorrupted copy of the portion of the data is not available on the one or more storage devices;
in response to determining that the uncorrupted copy of the portion of the data is not available on the one or more storage devices, retrieving a backup copy of the portion of the data from the key-value storage system that employs the different data storage format than the one or more storage devices, wherein the retrieving uses the unique identifier for one of the plurality of physical data blocks as a key to access the backup copy of the one of the plurality of physical data blocks in the key-value storage system; and
returning, during an operation to restore a corrupted copy of the portion of the data, a query response comprising the retrieved backup copy of the portion of the data.

17. The computing system of claim 16, wherein determining that the uncorrupted copy of the portion of the data is not available on the one or more storage devices comprises determining which of the one or more storage devices stores a primary copy of the portion of the data.

18. The computing system of claim 16, wherein determining that the uncorrupted copy of the portion of the data is not available on the one or more storage devices comprises determining which of the one or more storage devices stores a secondary copy of the portion of the data.

19. A non-transitory computer-readable storage medium storing program instructions that when executed on one or more computers cause the one or more computers to perform:
receiving a query from a client, the query targeting a data block of a plurality of data blocks that were previously stored in a cluster of computing nodes;
determining that a consistent and uncorrupted copy of the data block is not available in the cluster;
in response to determining that the consistent and uncorrupted copy of the data block is not available in the cluster:
initiating an operation to restore the data block to the cluster by retrieving a copy of the data block from a key-value storage system, wherein the cluster supports a different data storage format than the key-value storage system, and wherein the copy of the data block is indexed in the key-value storage system by a unique identifier associated with the data block; and
returning, during the operation to restore the data block, at least a portion of the copy of the data block to the client.

20. The non-transitory computer-readable storage medium of claim 19, wherein when executed on the one or more computers, the program instructions further cause the one or more computers to perform:
subsequent to said retrieving the copy of the data block from the key-value storage system, copying data in the retrieved copy of the data block to one of the cluster of computing nodes as a primary copy of the data block.

21. The non-transitory computer-readable storage medium of claim 20, wherein when executed on the one or more computers, the program instructions further cause the one or more computers to perform:
subsequent to said retrieving the copy of the data block from the key-value storage system, copying the data in the retrieved copy of the data block to another one of the cluster of computing nodes as a secondary copy of the data block.

22. The non-transitory computer-readable storage medium of claim 20, wherein when executed on the one or more computers, the program instructions further cause the one or more computers to perform:
subsequent to said copying the data in the retrieved copy of the data block to one of the cluster of computing nodes as the primary copy of the data block, updating a data structure that stores information about physical data blocks stored on the one of the cluster of computing nodes to indicate that the primary copy of the data block has been written to the one of the cluster of computing nodes.

23. The non-transitory computer-readable storage medium of claim 19,
wherein said initiating the operation to restore the data block is performed by a foreground process that receives and services query requests targeting data blocks stored in the cluster; and
wherein when executed on the one or more computers, the program instructions further cause the one or more computers to perform:

initiating, as a background process, a restore operation for two or more other ones of the plurality of data blocks that were previously stored in the cluster.

24. The non-transitory computer-readable storage medium of claim 19, wherein when executed on the one or more computers, the program instructions further cause the one or more computers to perform:
- logging, in a file or a data structure, information associated with the operation, wherein the information comprises: an indication of a failure of one of the cluster of computing nodes that resulted in the consistent and uncorrupted copy of the data block not being available in the cluster, an indication of a condition or event that triggered the initiation of the operation, or an indication that the operation was performed; and subsequent to said logging:
- accessing the file or the data structure to retrieve information associated with a plurality of restore operations; and
- analyzing the information associated with the plurality of restore operations as part of a failure analysis operation, a trend analysis operation, or a maintenance operation.

* * * * *